US008744880B2

(12) United States Patent
Gerber

(10) Patent No.: US 8,744,880 B2
(45) Date of Patent: Jun. 3, 2014

(54) SYSTEM AND METHOD TO PROVIDE FOR AND COMMUNICATE ABOUT SAFER AND BETTER RETURNING ASSET-LIABILITY INVESTMENT PROGRAMS

(76) Inventor: James G. C. T. Gerber, Charlottesville, VA (US)

( * ) Notice: Subject to any disclaimer, the term of this patent is extended or adjusted under 35 U.S.C. 154(b) by 521 days.

(21) Appl. No.: 12/726,768

(22) Filed: Mar. 18, 2010

(65) Prior Publication Data
US 2010/0256996 A1 Oct. 7, 2010

Related U.S. Application Data

(63) Continuation-in-part of application No. 12/580,846, filed on Oct. 16, 2009, now abandoned.

(60) Provisional application No. 61/136,942, filed on Oct. 16, 2008.

(51) Int. Cl.
*G06Q 40/00* (2012.01)
*G06Q 40/08* (2012.01)

(52) U.S. Cl.
CPC .................................... *G06Q 40/08* (2013.01)
USPC ............................................................ 705/4

(58) Field of Classification Search
USPC .................................................. 705/4, 35–45
See application file for complete search history.

(56) References Cited

U.S. PATENT DOCUMENTS

| | | | |
|---|---|---|---|
| 6,275,807 B1 * | 8/2001 | Schirripa | 705/36 R |
| 7,778,907 B1 * | 8/2010 | Haskins et al. | 705/36 R |
| 2007/0156559 A1 * | 7/2007 | Wolzenski et al. | 705/35 |
| 2008/0114703 A1 * | 5/2008 | Dahlberg et al. | 705/36 R |
| 2008/0133280 A1 * | 6/2008 | Ziegler | 705/4 |
| 2009/0030851 A1 * | 1/2009 | Tatro et al. | 705/36 R |
| 2010/0145879 A1 * | 6/2010 | Cali | 705/36 R |
| 2011/0191262 A1 * | 8/2011 | Caputo et al. | 705/36 R |
| 2012/0239593 A1 * | 9/2012 | von der Borch | 705/36 R |

OTHER PUBLICATIONS

Iafrate, Anthony. A Method for Risk Quantification for Surplus Requiremnts. Casualty Actuarial Society Discussion Paper Program. May 1992. vol. 2 pp. 657-678.*
OECD Publishing. OECD Private Pensions Outlook 2008. OECD Publishing, 2009. ISBN 9264044388, 9789264044388. p. 53.
Investment Company Institute. 401(k) Plan Asset Allocation, Account Balances, and Loan Activity in 2007. Washington, DC: Investment Company Institute. Dec. 2008. vol. 14, No. 3.
DiCenzo, Jodi. "Behavioral Finance and Retirement Plan Contributions: How Participants Behave, and Prescriptive Solution." EBRI Issue Brief. No. 301, Jan. 2007.

(Continued)

Primary Examiner — Stephanie M Ziegle
(74) Attorney, Agent, or Firm — Blank Rome LLP

(57) ABSTRACT

A data processing system compiles information about account holders, holdings, and other investment-related information. A hypothetical portfolio is generated to provide for a specified payout stream over a defined period of time, statistically evaluated, and compared by means of scaling to determine the best fit scale of the portfolio to the defined criteria. The composition of this scaled portfolio in comparison with the composition of the available assets defines a series of trades. The composition of the level of payout that can be expected to be supported by the new composition of available assets defines a series of insurance trades. Insurance providers can impose limitations and requirements on the assets managed by limiting or stipulating certain settings that a given account can be allowed to have.

103 Claims, 12 Drawing Sheets

(56) References Cited

OTHER PUBLICATIONS

Todorova, Aleksandra. "Lifecycle Funds Are Popular, but Not for Everyone." SmartMoney, Feb. 6, 2007.

Dennison, Terry. "Improving Target Date Lifecycle Funds." Mercer, LLC. Jul. 29, 2009.

Paskin, Janet. "Target-Date Fund Losses Prompt some to Rethink." SmartMoney, Feb. 12, 2009.

Mamudi, Sam. "Managed payout funds show flaws: Are new income-focused inventments living up to expectations?" MarketWatch. Aug. 22, 2008.

Ennis, Knupp & Associates, Inc. An Assett Allocation Analysis for Frozen Pension Plans. Chicago, IL: Ennis, Knupp & Associates, Inc., 2008.

Agnew, Julie R., and Lisa R. Szykman. "Asset Allocation and Information Overload: The Influence of Information Display, Asset Choice, and Investor Experience." The Journal of Behavioral Finance. vol. 6, No. 2 (2005): 57-70.

2008 Advisory Council Issue Paper: Spend Down of Defined Contribution Assets at Retirement "2008 Advisory Council Issue Paper: Spend Down of Defined Contribution Assets at Retirement" A working group commissioned by the U.S. Department of Labor. Employee Benefits Security Administration (Chair—Elizabeth Dill, Vice-Chair—Sanford Koeppel), Jan. 4, 2009.

Pang, Gaobo and Warshawsky, Mark. "Default Investment Options in Defined Contribution Plans: A Quantitative Comparison." Watson Wyatt Worldwide. Apr. 10, 2008.

Chris Soares and Mark Warshawsky. "Annuity Risk: Volatility and Inflation Exposure in Payments from Immediate Life Annuities." Center for Research on Pensions and Welfare Policies. Working Paper 22/02. Jun. 22, 2002.

VanDerhei, Jack. "Retirement Income Adequacy After PPA and FAS 158: Part One—Plan Sponsors' Reactions." EBRI Issue Brief. No. 307, Jul. 2007.

Pension Benefit Guaranty Corporation. An Analysis of Grozen Defined Benefit Plans. Washington, DC: Pension Benefit Guaranty Corporation, 2005.

Scholz, John Karl, Ananth Seshardri and Surachai Khitatrakun. "Are Americans Saving Optimally' for Retirement?" Journal of Political Economy. vol. 114, No. 4 (Chicago: University of Chicago, Aug. 2006).

Glasserman, P. 2004. Monte Carlo Methods in Financial Engineering. New York: Springer-Verlag.

\* cited by examiner

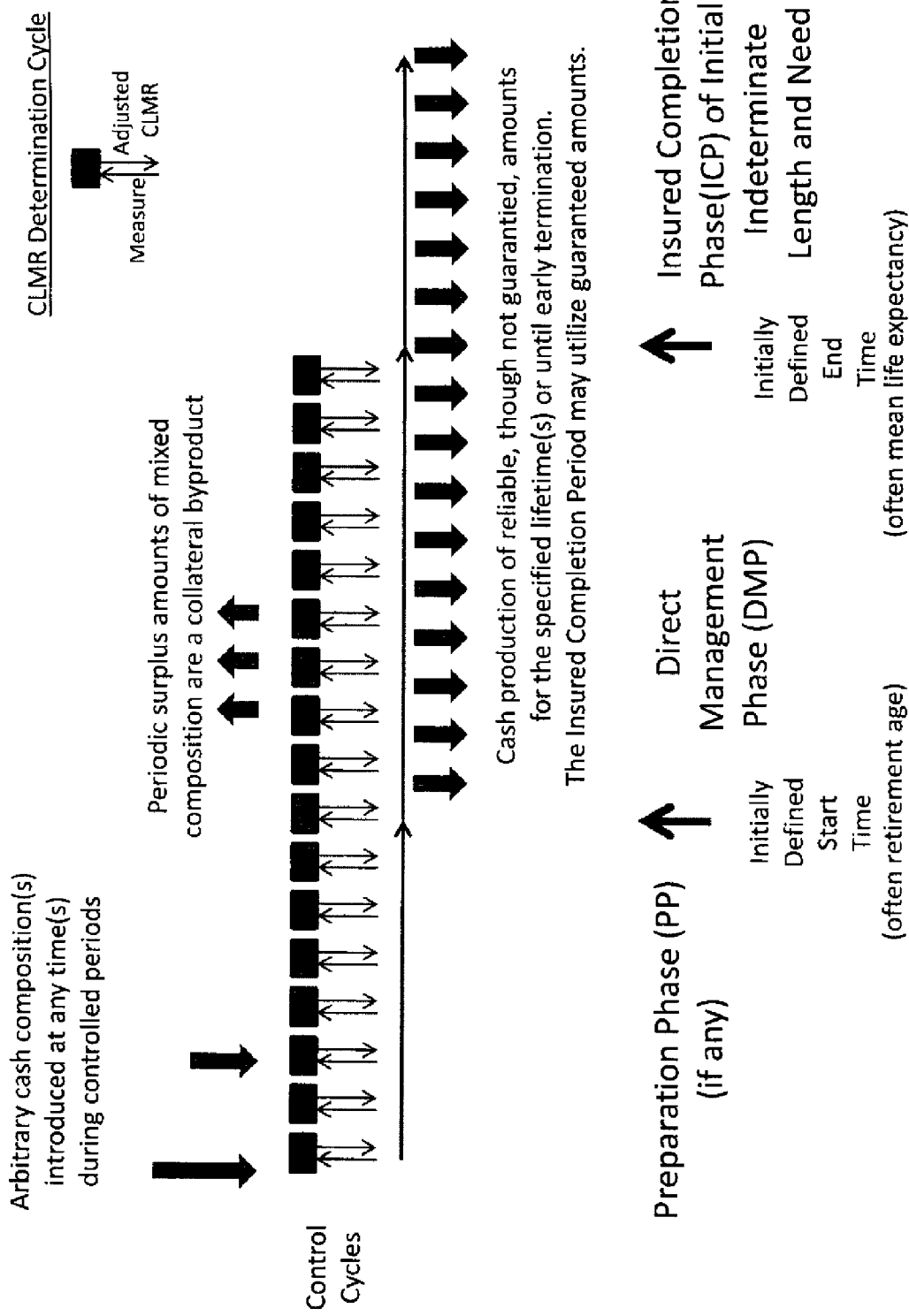

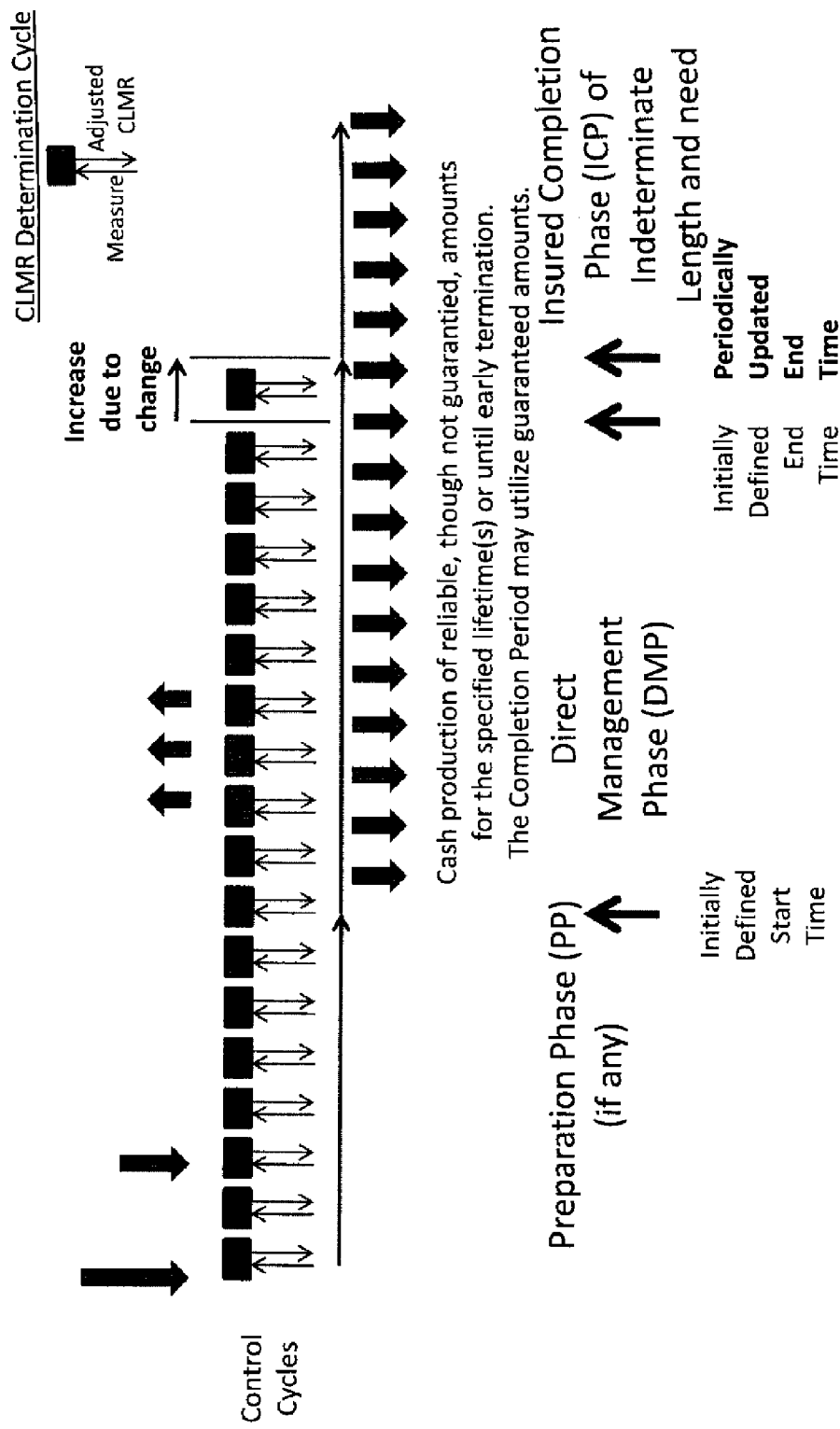
Figure 1b: Illustrated effect of a longevity change during routine cycles

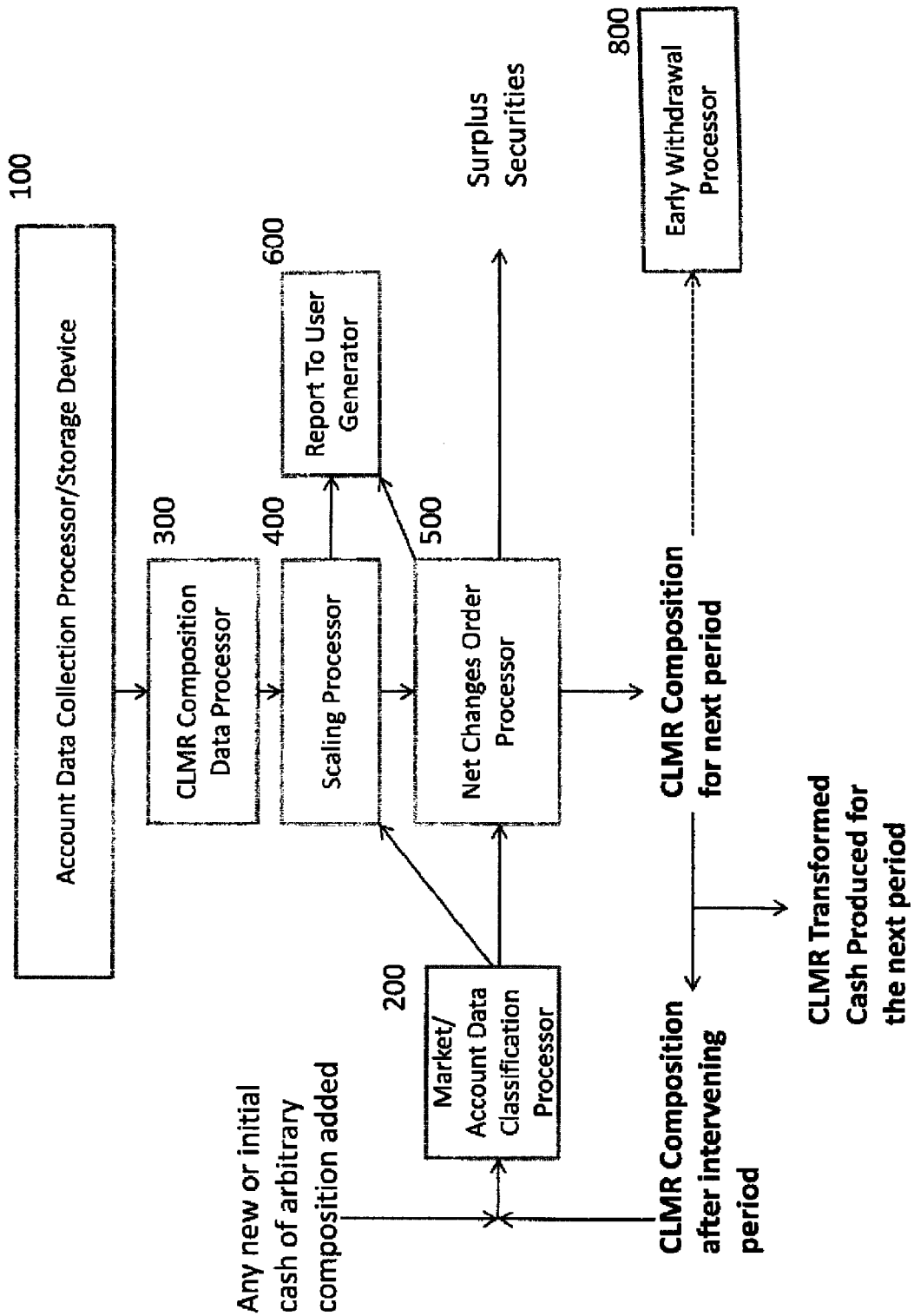
Figure 2: CLMR Determination Cycle

Figure 6a

User/Account Demographic Data: (Sub-Module 154 Data Sets)

| | | | | |
|---|---|---|---|---|
| User Name (First / Last) | _____ _____ | | Joint Survivor Name, If applicable) | _____ |
| Address | _____ | | Address | _____ |
| City, State, Zip | _____ _____ _____ | | City, State, Zip | _____ _____ |
| Age, Sex | _____ _____ | | Age, Sex | _____ _____ |
| As of | _____ | | As of | _____ |
| Contacts (home, cell, email) | _____ _____ _____ | | Contacts | _____ _____ _____ |
| Account Number | _____ | | | |
| Asset Denomination | _____ (e.g. USD) | | | As of |
| Current Assets In Account | _____ (from the Asset Value feed, but can also be manually entered - See Figure 6b) | | | _____ |

| | Firm | Account | Contact (Name/Number) | | | | | Auth Number |
|---|---|---|---|---|---|---|---|---|
| Asset Manager | _____ | _____ | _____ | | | | | _____ |
| Broker (if different) | _____ | _____ | _____ | | | | | _____ |

| | Up Front | Indexed | Forfeit | Other | | Indiv | Joint | Other |
|---|---|---|---|---|---|---|---|---|
| Insurance Format Preference | O | O | O | O | | O | O | O |
| Preferred Carrier | _____ | _____ | _____ | _____ | | | | _____ |

| | | | |
|---|---|---|---|
| Median Mortality Age (Ref) | _____ (from Insurance Tables) | $M_{Acct}$ | _____ |

Account CLMR Preferences: (Sub-Module 156 Data Sets)

| | | Current Values (Listed for Reference) | | Default |
|---|---|---|---|---|
| DMP Start Year | _____ | $Y_{DMP-S}$ | | [now] |
| DMP End Year | _____ | $Y_{DMP-E}$ | | [Median mortality age - Current Age] |
| Number of Years in DMP | _____ | $n$ | | [DMP End Year - DMP Start Year] |
| Desired Periodic Payment | $C_{O-Desir}$ | $C_{O-Curr}$ | $C_{E-Curr}$  $I_{O-Curr}$ | |
| Inflation Increase (%/yr) | _____ $g$ | $g$ | | |
| % of Non Fixed to Fixed in DMP | Other Preference Setting | $NFR_{DMP}$ | | [50%] |
| % of Non-Fixed to Fixed in PP | Other Preference Setting | $NFR_{PP-Ref}$ | | [80%] |
| PP Reference Year | Other Preference Setting | $Y_{PP-R}$ | | |
| % of $C_O$ Fixed in first year | Other Preference Setting | $CR_{DMP-1}$ | | [70%] |
| Number of years in stepdown | Other Preference Setting | $n_s$ | | [3] |
| % of Dollar Duration Matched | Other Preference Setting | $DD_{DMP}$ OR | Advanced Settings | [90%] |
| Allow longest fixed > End Year | Other Preference Setting | $FL_1$ | | [Y] |
| Max fixed in any given period | Other Preference Setting | $FM_1$ | | [120%] |
| Cum probability for $C_s$ | Other Preference Setting | $P_{CS}$ | | [80%] |
| Optimize non-fixed | Other Preference Setting | $FL_2$ | | [Y] |
| Rebalancing Frequency | times/year | $f$ | | [4] |
| Rebalancing Threshold | Surplus Settings (%) | $T$ | | [5%] |
| Activate Trading | Surplus Settings (%) | $Active_T$ | | [N] |

Account Surplus/Deficit Preferences: (Sub-Module 158 Data Sets)

Desired Settings for Periodic Payment Levels and Related Insurance Levels

| | | Directly Managed Period (DMP) | | | | Insured Completion Period (ICP) | | | | | Notify of |
|---|---|---|---|---|---|---|---|---|---|---|---|
| | Keep Invested/Insure To | $C_s$ | $C_O$ | None | $C_{Other}$ | $C_{eS}$ | $C_e$ | Prev $C_e$ | None | $C_{Other}$ | Change to |
| Surplus: | All Available | O | O | O | O _____ | O | O | O | O | O _____ | O |
| | Max to Desired $C_O$ | O | O | O | O _____ | O | O | O | O | O _____ | O |
| | Max/Hold to Prev $C_O$ | O | O | O | O _____ | O | O | O | O | O _____ | O |
| | Other | O | O | O | O _____ | O | O | O | O | O _____ | O |
| Deficit: | Reduce Non-Fixed % | O | O | O | O _____ | O | O | O | O | O _____ | O |
| | Decrease $C_O$ | O | O | O | O _____ | O | O | O | O | O _____ | O |
| | Other | O | O | O | O _____ | O | O | O | O | O _____ | O |

Figure 6b

Current Available Tradeable Assets: Example Primary Asset Class Characterizations

| | Govt/ Agency Issues | TIPS | Tax Exempt Bonds | Corporate A | Corporate B | High Yield |
|---|---|---|---|---|---|---|
| Fixed Income (PV, YTM) | | | | | | |
| Money Market | | | | | | |
| Yr 1 Maturing | | | | | | |
| Yr 2 Maturing | | | | | | |
| Yr 3 Maturing | | | | | | |
| Yr 4 Maturing | | | | | | |
| Yr 5 Maturing | | | | | | |
| Yr 6 Maturing | | | | | | |
| ... | | | | | | |

Non-Fixed Income (PV, Avg Return, Volatility)
    Equities By Sector (Tech, Util, Mfg, Fin, etc.)
    Real Estate
    Private Equity
    International

Figure 6c

Account CLMR Preferences: (Sub-Module 156 Data Sets -- Advanced Duration Settings)

| | | Current Values (Listed for Reference) | Default |
|---|---|---|---|
| % of $C_0$ prefund for fluctuations | Adv Duration Setting | $MSPLS_{Pre}$ | [40%] |
| Max % of $C_0$ held for fluctuations | Adv Duration Setting | MSPLS | [20%] |
| % of extra held for fluctuations | Adv Duration Setting | MODR | [70%] |
| Max % phase out years | Adv Duration Setting | $POY_{MS}$ | [12] |
| Extra Holdback phase out years | Adv Duration Setting | $POY_{MODR}$ | [12] |
| Number of years in Step Out | Adv Duration Setting | $n_{so}$ | [2] |
| Ending % in step out | Adv Duration Setting | $CR_{DMP\text{-}last}$ | [90%] |
| Start Year for Tilt | Adv Duration Setting | $n_{tilt}$ | [4] |
| %/Year of Tilt | Adv Duration Setting | $CR_{tilt\text{-}yr}$ | [1%] |
| Suspend Conversions on sig change | Surplus Settings (%) | $FL_3$ | [Y] |
| Sig Change threshold | Annl Change Threshold (%) | SCT | [-20%] |
| Carry forward Prev CLMR Settings | Surplus Settings (%) | $CF_{y\text{-}n}$ | [Y] |

Figure 6d

Simplified User Interface: (Sub-Module 510 -- Basic Presentation Format)

|  |  | User Input |
|---|---|---|
| 1) | How much do you have to invest in your CLMR? | $1,350,000 |
| 2) | What % of your Income are you planning to replace? | 50% |
| 3) | How many years from now to you want the replacement to begin? | 0 |
| 4a) | How many years do you want the replacement to cover? |  |
|  | OR |  |
| 4b) | Match the end to the average longevity for my age? | Y |
| 5) | Do you intend for this to be matched to a following deferred annuity? | Y |
| 6) | Do you want any upside to be reinvested in increased future pay outs? | Y |

Based on your settings, current market values and the closest applicable CLMR configuration, your funds should provide for a target annual payout from 2010 to 2025 of $125,180 -- excluding the cost of the follow on annuity.

(a) Please select an annuity provider if you wish a portion of your invested funds to co-fund a follow-on deferred annuity.

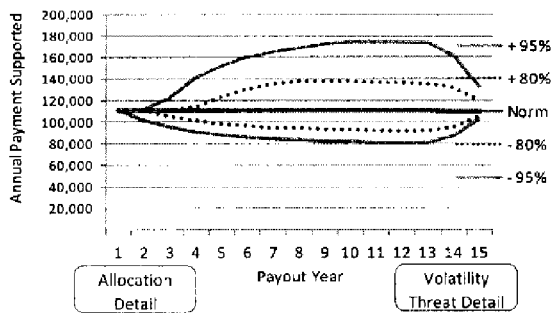

NOTE: The CLMR selected has a residual potentital, based on historical volatility, to reduce likely single year declines to 1-2%*.
This represents a 39% reduction in the potentital for one-year downside movement compared to a standard laddered portfolio.

An increased replacement % can lower this potential for downside change further.

* Variation estimates are drawn from the 80% confidence level and assume your portfolio will face threats similar to historical ones.

SYSTEM AND METHOD TO PROVIDE FOR AND COMMUNICATE ABOUT SAFER AND BETTER RETURNING ASSET-LIABILITY INVESTMENT PROGRAMS

REFERENCE TO RELATED APPLICATION

The present application is a continuation-in-part of U.S. patent application Ser. No. 12/580,846, filed Oct. 16, 2009, currently pending, which claims the benefit of U.S. Provisional Patent Application No. 61/136,942, filed Oct. 16, 2008. The disclosures of both of the above-cited applications are hereby incorporated by reference in their entireties into the present disclosure.

FIELD OF THE INVENTION

The invention relates to a system and method for comprehensive, risk managed investment and payout management of variable length target liability streams such as, but not limited to, defined benefit pension liability obligations. A novel mix of investment principles, analytics and practices, in specific combination, reduces expected surplus risk of the asset returns vs. the liabilities while increasing expected surplus return. The invention includes methods of communication about the degree to which differing portfolios might be able to meet payout obligations with similar associated risk factors.

COPYRIGHT NOTICE

A portion of the disclosure of this patent document contains material which is subject to copyright protection. The copyright owner has no objection to the facsimile reproduction of anyone of the patent document or the patent disclosure, as it appears in the Patent and Trademark Office public patent files or records, but otherwise reserves all copyrights rights whatsoever.

BACKGROUND OF THE INVENTION

Investors, particularly those reaching or in retirement, have a particularly significant challenge to understand how combinations of assets they may have accumulated can be deployed and how they may be expected to be able to achieve certain objectives typical of that phase of life, particularly, providing for a steady or gradually changing stream of income for the rest of their lives. Optimal deployments require the coordinated management of fixed and non-fixed income securities relative to specific payout periods as well as of related insurance arrangements to help manage longevity risk. For the vast majority of ordinary investors in, or planning for, retirement, the complexities of this information gathering, evaluation, and coordination prevent rapid, effective and regular decision making with the end result that savings prove to be inadequate, retirement plans need to be altered, and/or year-to-year payouts shift unnecessarily rapidly and unpredictably.

Since 1980, such investors have also become highly dependent on a wide variety of self-directed accounts (OECD Publishing. *OECD Private Pensions Outlook* 2008. OECD Publishing, 2009. ISBN 9264044388, 9789264044388. p 53) through which they can invest (e.g. IRA, 401(k), taxable brokerage, etc.) and a wide variety of instruments (e.g. fixed income securities such as notes and bonds issued by governments and corporations, non-fixed income securities such as stocks and other equity like holdings, and insurance products such as immediate and deferred annuities).

The wide range of asset allocation choices found within self-directed investment plans focused on accumulating savings for retirement (e.g. IRA, and 401(k)) (Investment Company Institute. 401(k) *Plan Asset Allocation, Account Balances, and Loan Activity in* 2007. Washington, D.C.: Investment Company Institute. December 2008. Vol. 14, No. 3) is indicative of the difficulty many investors in such plans have in making consistent and rational choices about how to allocate their assets towards a particular retirement objective (DiCenzo, Jodi. "Behavioral Finance and Retirement Plan Contributions: How Participants Behave, and Prescriptive Solutions." *EBRI Issue Brief*. No. 301, January 2007). This is further supported by the often observed under performance of these plans relative to professionally managed plans, such as pension plans, invested towards similar objectives and over similar time frames. Research in the field of behavioral finance has found that the complexity of communications about options, not to mention the wide range of the options themselves, has caused many self-directed investors to make and maintain sub-optimal choices over prolonged periods of time without any means of periodic self-correction and adjustment (*EBRI Issue Brief*. No 301, 2007).

One approach to this problem has been to reduce options and to make asset allocation choices more automatic. The advent of balanced funds (containing a pre-determined mix of non-fixed income and fixed income securities) was an early response that created one method for investors to standardize their investment options relative to an objective. This was followed by lifecycle or target date funds that provide for a shifting mix of non-fixed to fixed income securities as an investor ages (Todorova, Aleksandra. "Lifecycle Funds Are Popular, but Not for Everyone." *SmartMoney*, Feb. 6, 2007). These have all provided basic methods for further encouraging not only sector and duration diversification but also shifts in these diversifications over time, that begin to approximate best practices utilized by investment professionals; however, these have come at an increased cost to investors as these products are built with layers of funds and accompanying fees. More significantly, these options provide no relationship, however directional, in terms of the ability of these investment choices to achieve a particular payout objective starting at some point in the future. These funds cannot be customized or adjust to an investor's needs. Rather, the investor must first determine what their needs and risk tolerances are, if they can, and then find the fund that most closely matches that need.

Few, if any, of these kinds of fund options differentiate between investments before and after targeted retirement (i.e. where assets shift from periodic accumulation to often steadily periodic liquidations). Fewer still, if any, provide information for their investors relating the level or amount of their investments with an ability, much less a range of possibilities, relating to how long their investments might last when applied to a targeted payout stream or "burn rate" (Dennison, Terry. "Improving Target Date Lifecycle Funds." Mercer, LLC. Jul. 29, 2009).

The lack of information to investors, even in the most advanced of the lifecycle funds, both in helping to make an initial choice and about the relationship of their asset allocations to an ability to generate a particular stream of income during retirement has been most recently illustrated by the surprise many investors expressed when they realized life cycle funds they thought had been conservatively allocated and represented automatic access to investment best practices turned out to be more volatile than they had expected (Paskin, Janet. "Target-Date Fund Losses Prompt Some to Rethink." *SmartMoney*, Feb. 12, 2009). While this relates in part to disclosure about the funds, it more fundamentally relates to the lack of information about the range of volatility the assets of these investors might have and the possible short and long term effects that volatility might have on realizing a steady, multi-year payout. Mere disclosure about the presence of volatility, without quantitative information relating that volatility to the ability to meet a payout objective investors can understand, did little to close the information gap for these investors about how they expected the funds to perform relative to their real world savings and payout objectives.

Most recently, new classes of investment funds have emerged, such as payout funds, that explicitly change the focus of invested assets towards payout in ways that the lifecycle funds had not. Like life cycle funds, these too, contain multiple layers of fees. Different from life cycle funds, they do differentiate between the time that primary investment inflows end and retirement outflows begin. Many, typically, link each immediate period in the payout stream in a fixed ratio to the net asset value of the holdings where, when holdings appreciate by 10%, for instance, the payout for that year increases by 10%. Similarly, when such holdings depreciate by 10%, the payout for that year decreases by 10%. Alternatively, for funds that seek to hold payout steady even as holdings depreciate, larger than expected portions of the invested funds are ratably liquidated, often unnecessarily damaging the ability of the remaining assets to generate needed returns. Such funds continue to lack clear linkage between the assets invested and their allocations to being able to achieve a particular payout stream over multiple years of a given length including communicating even basic information about a range of possibilities inherent in the volatility of the assets in which they have chosen to invest (Mamudi, Sam. "Managed payout funds show flaws: Are new income-focused investments living up to expectations?" *MarketWatch*. Aug. 22, 2008.).

In addition, though many of these funds provide access to fixed income securities of varying durations, they do so through intermediate funds. Without the ability to manage direct investment in fixed income securities of specific maturities and duration, self-directed investors are deprived of a substantial amount of ability to match the duration of their investments to the timing, and thus the duration, of the outflow stream they wish to be able to generate. This can present significant unnecessary exposure to loss of principle. It also limits the ability to arrange that properly sized, short duration fixed income securities, able to resist short term market swings, are the ones that are primarily liquidate as each payout period arrives—protecting the ability to maintain a particular payout level while also protecting more volatile securities from being the ones liquidated to maintain that payout level during short term (1-2 year) market downturn swings. Professionally managed pension funds depend on such control to obtain superior results with lowered risk (Ennis, Knupp & Associates, Inc. *An Asset Allocation Analysis For Frozen Pension Plans*. Chicago, Ill.: Ennis, Knupp & Associates, Inc., 2008.); but without such tools, visibility and ability to directly access fixed income securities matched to critical parts their desired outflow stream and that can mature in matched periods, self-directed investors today, even through payout funds, are missing capabilities that can demonstrably improve the ability of their investments to more optimally meet steady or gradually changing payout stream objectives.

Fewer still, if any of these fund and investment options, provide information to their investors relating to what might constitute realistic levels of target payout streams, either in level or the time before they are likely to be exhausted, or to matched insurance-related arrangements that can provide for a continuation of payment after those assets have become exhausted.

The plurality of the differing funds involved further compound the ability of individual investors and their advisors to obtain comprehensive information from any one source about the assets they control and the ability of those assets to produce a desired level of income over an indeterminate period of time, typically the remainder of the life of the investor or a joint survivor. Such comprehensive information needs to include management and matching of current assets which, in combination with an expected stream of payouts, have a probabilistically predictable time over which they will be depleted, and insurance arrangements which, if matched in amount and start time, are able to continue that stream of payouts over the remainder of the life of the investor or a joint survivor. A series of behavioral finance findings reported over the last decade suggest that this complexity will produce sub-optimal investment choices even in those with high levels of financial knowledge (Agnew, Julie R., and Lisa R. Szykman. "Asset Allocation and Information Overload: The Influence of Information Display, Asset Choice, and Investor Experience." *The Journal of Behavioral Finance*. Vol. 6, No. 2 (2005): 57-70.) and (*EBRI Issue Brief*. No 301, January 2007).

Such comprehensive information, if it were available, could help individuals with all levels of financial knowledge by allowing those with high levels to optimize their choices better, those with medium levels of such knowledge to make sufficiently informed choices to break out of habits that have tended to lock them into sub-optimal choices, and even those with low levels of such knowledge to make effective basic choices. While investors at all knowledge levels may have difficulty understanding the full range of multiple asset classes and their relative and interrelating characteristics, there is a higher chance that such individuals can understand the relative possibilities of achieving payouts for certain periods of time matched to their own lives and spending levels and very basic concepts such as the mix of fixed income vs. non-fixed income asset classes. Improvement in information presentation that can lead to better basic investment behavior is an area where improvements continue to be needed and where improvements can help remedy a primary cause of large sets of individuals making sub-optimal investment choices for retirement over sustained periods of time.

As an alternative to managing a retirement payout through self-directed means, there have long existed insurance-based options that do provide clarity between these relationships.

Immediate fixed annuities, that are well known and have existed for some time, and purchased at the beginning of a retirement period can meet such an objective; however, they require that all assets dedicated for such a purpose be immediately transferred to a single account and the guaranteed nature of these investments create their own particular shortcomings for investors. First, by fully transferring risks, most notably substantial periods of investment market returns and longevity, to the insurance company, the insurance company must charge the investor for taking on those risks. Those charges take the forms of material discounts compared to the value of professionally managed investment holdings of comparable size, involve an inherent shift to lower yielding fixed income investments and involve layers of higher fees. Though individually disclosed, the effect of these charges compared to alternative means of achieving the same objective is complex and hard to analyze for the average investor. Further, fixed annuities lack liquidity, cannot be changed once started, and do not respond well, if at all, to inflation.

Immediate variable annuities transfer some market risk back to the investor; however, relative lack of control and highly limited investment options, requirements to pay the insurance companies and their fund managers for all trading activity (with their own multiple layers of fees) as well as the continuing lack of transparency as to the overall effects of fees and utilization of these vehicles continue to leave them with drawbacks which many investors still consider to be too high to extensively utilize.

One measure of this often perceived lack of overall economic value is the comparatively small number of professionally managed pension funds who view a standard termination (by definition the transfer of professionally managed pension assets into annuities) of even frozen pension funds as economically attractive. This is even when such professionally managed pension funds are able to negotiate attractive rates for the bulk annuities they would purchase. The discounts applied to individuals seeking such a transfer are more disadvantageous.

Insurance products also contain inherent charges for the tax free investment protection they provide; however, most investors today have access to other tax advantaged vehicles, such as IRA and 401(k) accounts, able to provide equal advantages.

While the use of annuities or other shared risk, income generating products, nevertheless remain the only viable way to adequately provide for income through to the end of a lifetime, one way to minimize the costs and lack of transparency as well as to maintain the trading flexibility and the ability of investors to choose investment vehicles and trading platforms of their own to minimize fees and maximize performance is to delay the start of the insured period and to allow investors to manage assets on their own through to the start of that period. This is the kind of approach taken by the present invention.

The present invention and its related descriptions hereinafter often refer to "insurance," "insurance products," "other shared risk, income generating products" and like terms. Unless otherwise specified—such as in the use of the term "insurance companies" which refers to companies certified and regulated to provide insurance products, such as annuities—these terms are intended to be broadly interpreted to describe a contractual arrangement between an investor and a third party provider, regulated as a provider of insurance or not, to provide income, not necessarily guaranteed, from the start of a particular period (potentially event, rather than date, driven) to the end of an investor's life (or, in the case of a joint survivor, investor's lives). Examples of such other alternative third parties not regulated as insurance companies include, but are not limited to, pension funds.

There is at present no comprehensive way for an investor to directly relate and to manage market and inflation risk and to seek low fee options to generate a steady or gradually changing income stream for much of their expected retirement, while also giving the investor visibility into the potential relationship of matched insurance arrangements that can continue that income stream if their retirement lasts longer than they might expect. In order to do this, the investor must manage their own investments, now directly relative to a desired payout stream, using securities that are going to continue to vary in rates of return over an extended period of time and they must manage both the level and longevity of that stream relative to either their life expectancy (if they chose not to have any insurance products) and/or relative to a set of delayed start or deferred insurance arrangements.

Computerized tools and methods have evolved over time to address some of the shortcomings, however, most continue to address the management of the outflow stream prior to the initiation of coverage by insurance products relative to guarantied levels of payout. They do not address the matching of expected (mean) overall return to the payout stream, support calculated sizing alternatives relative to estimated probabilities of coverage of less than 100% and/or provide matching and linkage to insurance products to keep their levels and start dates matched with the portion of the payout stream being covered by the direct management of assets.

Further, these tools and methods do not provide a means for positive control and linkage of potential requirements of insurance arrangements back to the directly managed assets, inhibiting the introduction and utilization of alternative insurance products that could take advantage of such capabilities to further reduce cost to the investor and increase the amount of their assets, and thus the potential level, of a payout stream during the part of the period (the early years) where they have the highest probability of living to actually benefit from the payout stream.

Finally, though there are many investment performance indices available today, most focus of the expected (mean) performance of an individual security or class of like securities (e.g. publicly available bond and S&P indices). Few, if any, are available to index performance of a disparate collection of investments in a given portfolio of such investments relative to a defined payout stream, much less relative to the probability of that portfolio to fully cover that stream (i.e. to consider the relative size of potential downside outcomes). The latter aspect, in particular, requires that the index be able to reflect the potential for downside performance of a subject portfolio of assets relative to some recognizable reference standard.

No program exists, to the knowledge of the inventor, which can provide investors with manual and automated means of managing assets and insurance products in a coordinated and comprehensive manner to provide for payout streams with associated time extension risk factors, considering and protecting, at least in part, from interest rate risk, one able to identify surpluses and respond to deficits vs. the target payout/liability stream and one that can factor in time extension (e.g. longevity expectations) and market change risks that arise over time. Nor is there a readily understandable means of communicating to investors the comparative ability of differing portfolios to cover such time varying and annuity-like payout liability streams.

The following references are cited to provide additional background information on the invention:

2008 Advisory Council Issue Paper: Spend Down Of Defined Contribution Assets at Retirement "2008 Advisory Council Issue Paper: Spend Down Of Defined Contribution Assets at Retirement" A working group commissioned by the U.S. Department of Labor. Employee Benefits Security Administration (Chair—Elizabeth Dill, Vice-Chair—Sanford Koeppel), Jan. 4, 2009.

Pang, Gaobo and Warshawsky, Mark. "Default Investment Options in Defined Contribution Plans: A Quantitative Comparison." Watson Wyatt Worldwide. Apr. 10, 2008.

Chris Soares and Mark Warshawsky. "Annuity Risk: Volatility and Inflation Exposure un Payments from Immediate Life Annuities." Center for Research on Pensions and Welfare Policies. Working Paper 22/02. 22 Jun. 2002.

VanDerhei, Jack. "Retirement Income Adequacy After PPA and FAS 158: Part One—Plan Sponsors' Reactions." *EBRI Issue Brief.* No. 307, July 2007.

Pension Benefit Guaranty Corporation. *An Analysis of Frozen Defined Benefit Plans*. Washington, D.C.: Pension Benefit Guaranty Corporation, 2005.

Scholz, John Karl, Ananth Seshadri and Surachai Khitatrakun. "Are Americans Saving Optimally' for Retirement?" *Journal of Political Economy*. Vol. 114, no. 4 (Chicago: University of Chicago, August 2006).

Glasserman, P. 2004. *Monte Carlo Methods in Financial Engineering*. New York: Springer-Verlag.

SUMMARY AND OBJECTS OF THE INVENTION

It is, therefore, an object of the present invention to provide a system for routinely reducing current information about owners of a particular account into a series of trading instructions for both investment securities and insurance products, designed to meet a target payout objective with a predicted range of outcomes and able to be executed on low cost trading platforms.

It is also an object of the present invention to provide a system for collecting information on market activity in traded fixed income and non-fixed income securities and publicly quoted insurance and to quantify their ability to be matched to a payout stream objective.

It is another object of the present invention to provide an apparatus for the select processing of several types of data wherein data is qualified prior to use and translating the qualified data into a hypothetical portfolio of fixed income and non-fixed income securities with a particular character matched to a particular given payout stream.

It is still another object of the present invention to provide a system for scaling that hypothetical portfolio against several available criteria, including available assets, and various levels at which the payout stream might be realized, while simultaneously considering the asset requirements of matching publicly quoted insurance to those variously scaled values.

It is still another object of the present invention to provide a system for translating the scaled hypothetical portfolio into a series of trading instructions that can be executed in the public securities and insurance markets.

It is still another object of the present invention to present options and a range of possible outcomes, particularly with regard to degrees of conservatism, to investors in a comprehensive, although simple to understand series of formats.

It is yet another object of the invention to provide a combination of investment, outcome evaluation and insurance rebalancing processors, integrated with each other, to address the above-noted shortcomings of the prior art in order to allow investors preparing for or in retirement, or some like period where they wish to rely on a payout stream with an indeterminate length, to make optimal use of the assets they have available for that purpose.

The above and other objects of the present invention are realized in a specific illustrative data processing system for the compilation of disparate information about the owners of a particular account, holdings they might have in a particular account for the purpose of meeting a defined payout objective for a defined period of time, and current and historical pricing of a wide variety of assets, specifically including fixed income securities with tenures of one to thirty or more years as well as current rates applicable to a variety of payout generating insurance products into discrete data files of varying reliability. The data is thereafter classified in order to be used to generate a hypothetical portfolio matched to providing for a specified payout stream over a defined period of time. The forgoing portfolio is then statistically evaluated using current and historical yields of particular fixed and non-fixed income securities and characterized with regard to effective composite yield and likelihood of meeting the objective of the defined payout stream. The characterized portfolio is then compared by means of scaling against a set of potential sizing criteria, which include available assets and desired levels of payout, to determine the best fit scale of the forgoing portfolio to the defined criteria. Finally, the composition of this scaled portfolio in comparison with the composition of the available assets defines a series of trades and changes to income generating insurance products best matched to the pre-specified criteria for the account.

The processor can be run one time, but it is also designed to operate repeatedly over time so that the processor can re-evaluate the scaled hypothetical portfolio to reflect demographic changes in the holders of the account over time, changes in their preferences as defined for the various embodiments of the present invention, and changes in market condition and to direct trades and changes, to rematch the periodically rescaled hypothetical portfolios to those changed positions. By iteratively processing through a series of accounts on a regular basis, large numbers of accounts can be kept matched to their respective criteria and changing market and demographic conditions over time.

A number of models provide median outcomes and, some, probability distributions. Few present the comparative downside aspects of the probability distribution which should be as important and relevant to investors and other parties interested in the ability of a portfolio to meet (i.e. generate a surplus to or suffer a deficit from) a given defined liability stream; however, the ability of investors and other interested parties to easily and quickly access and interpret these distributions, much less to do so on a reliably comparative basis between portfolios, is difficult to nearly impossible for most, even highly trained, individuals.

In accordance with the varying aspects of the present invention, the system further includes a module for generating an easy to understand index identifying the relative abilities of differing investment portfolios to meet a specified payout stream objective covering a fixed period of time as well as communicating its downside characteristics by utilizing the stochastic modeling and scaling capabilities of the present invention. Those capabilities generate the stochastic return profile, including the mean and downside outcome likelihoods, for any given portfolio of publicly traded securities, in comparison with the return profile of a standardized portfolio of the character defined by the present invention, including the mean and downside outcome likelihoods of each, and reporting a comparative index from a ratio relating the two. The mean and downside characteristics of many different portfolios can be reliably indexed to the performance of a standard portfolio by this means.

The comparative index made possible by the present invention provides such a means for investors and other interested parties to easily and quickly access and interpret the potential for a given portfolio or fund to meet an outflow objective both in terms of its mean outcomes but also its potential for generating downside outcomes.

It is still another object of the present invention to provide a means for insurance providers to impose limitations and requirements on the assets managed through the present invention, by limiting or stipulating certain settings for the present invention that a given account can be allowed to have and a means of reporting the state of those settings and of the account to those insurance providers.

Once such example where this linkage may be beneficial is where the income stream of an insurance provider will not start until the longevity index for a certain population reaches a certain level (e.g. when half of a particular population has died). In this case, the income generating period covered by directly managed assets, must extend or contract to match the length of time when this event might be forecast to occur.

In another example, an investor may agree to forfeit a part or all remaining assets of the account should they or their joint survivor die before an insurance covered period begins partially or in lieu of a fixed, single up-front payment. In this event, the insurance provider may stipulate such settings of the present invention such as maximum levels of payout, of allocation to non-fixed investments and of certain asset classes, and extent of duration matching.

Though such index-based, forfeiture-based and other insurance arrangements that involve coordination and degrees of control over individually managed assets do not exist today, at least for the average investor, the present invention provides the ability to support or substantially support the kinds of requirements such arrangements may require. To that extent, the present invention can be used to facilitate creation, utilization and management of these kinds of insurance arrangements for investors and account holder who utilize the present invention.

The primary and most basic functions of the present invention make it particularly suitable (i) to assist individual investors in self-directed investment vehicles to plan for and manage assets and, potentially, related insurance arrangements to achieve steady or gradually changing payout objectives typical of retirement phase investment activities (ii) to assist investment managers handling invested funds for pre- and post-retirement phase investors, particularly those wishing to have their assets specifically managed against a specified payout stream objective and particularly as well if they wish to keep the projected mean longevity and level of that payout stream matched with deferred annuity-like insurance arrangements, (iii) to assist insurance providers in keeping their products and offerings matched to the needs of pre- and post-retirement phase investors who wish to provide for continued income should they outlive the period over which their retirement assets can be reasonably expected to last and (iv) to allow index providers to generate useful payout stream related performance indices for different portfolios, funds and investment vehicles. In addition to those applications, the present invention can provide for sufficient forms of control over related investor assets that might enable insurers to offer new ways to provide for deferred annuity-like streams with the potential for substantially lower up-front costs to investors than are available today.

BRIEF DESCRIPTION OF THE DRAWINGS

The foregoing features and benefits associated with the present invention may be more fully appreciated pursuant to the following detailed discussion of a specific embodiment thereof, taken in conjunction with the Figures appended hereto, wherein:

FIG. 1 illustrates terminology covering time periods over which the present invention can operate relative to a particular account, the periods over which repetitive application of the present invention are intended to operate, and the periods over which matched, income producing insurance products are intended to operate.

FIG. 1b illustrates how the time period definitions and application of the present invention might change over time. In this case, how its application might be effected by a change in longevity expectations for the account holder.

FIG. 2 is a functional block diagram of the primary discrete components forming the network associated with the present invention.

FIGS. 6a, 6b and 6c identify the primary data items that the account data collection module of the present invention provides a means of displaying and adjusting to maintain a representation of the current preferences and settings for each account. FIG. 6d illustrates a basic user interface and results presentation.

DETAILED DESCRIPTION OF THE PREFERRED EMBODIMENTS

Figure 3:
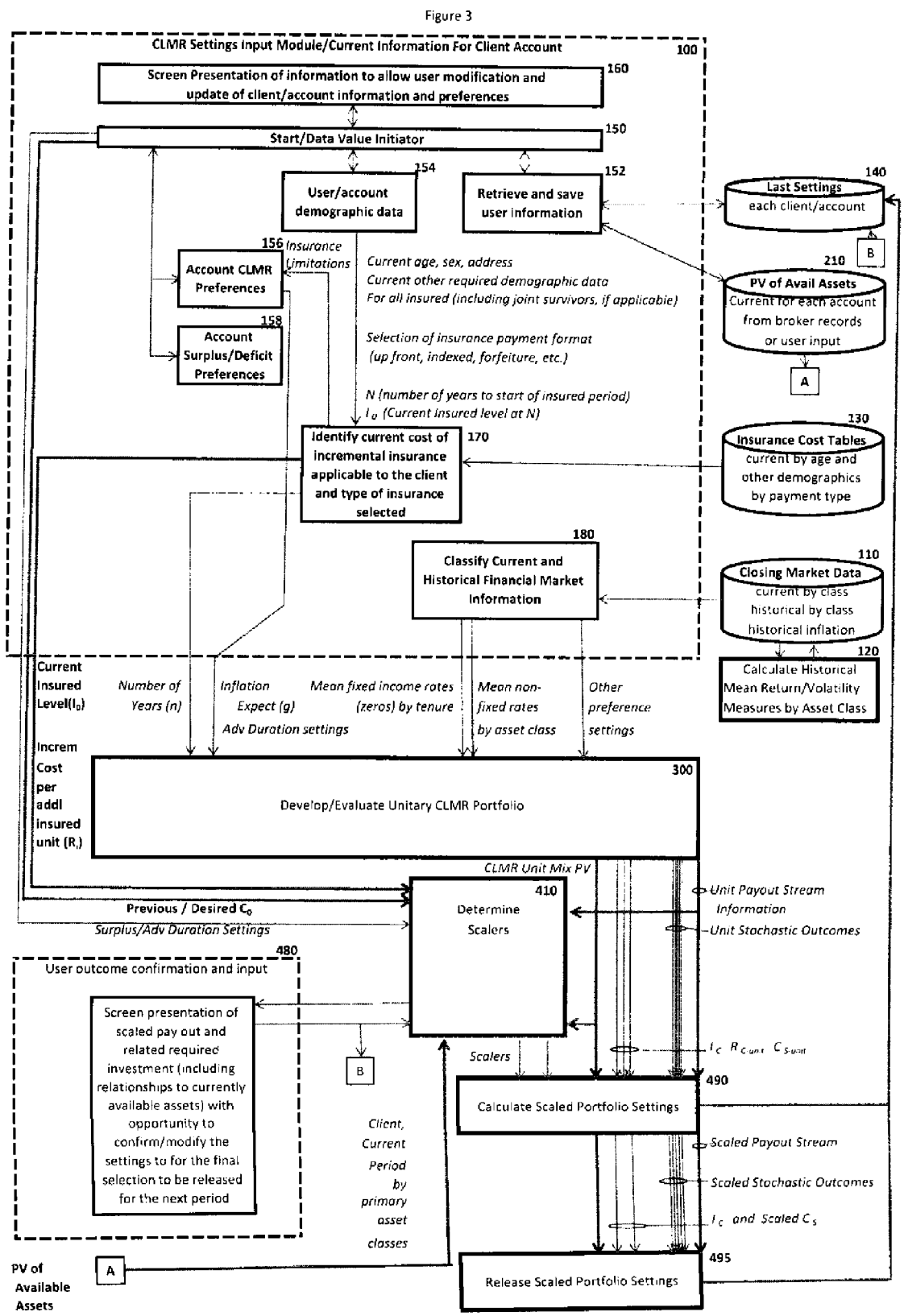
FIG. 3 is a logic flow depicting the processing paths and data flows between the primary modules and data storage devices, other than the account data collection component and the early withdrawal processing modules, that comprise the primary discrete components of the present invention.

Turning now to FIG. 1, the way the present invention is intended to operate is depicted through the use of a time line related to the progressive age of an individual or joint survivor collection of individuals. It delineates three periods: a Preparation Phase (PP), a Direct Management Phase (DMP), and an Insured Completion Phase (ICP). With regard to all three phases, the present invention defines and evaluates portfolios with cash outflows that occur during the Direct Management Phase.

The Preparation Phase, if the present invention is being used at any time prior to the date which has been defined for the account as the beginning of the DMP, provides for the assembly of assets and the progressive evolution of their mix over time to match settings that the present invention is to apply to the first period in the DMP.

In the preferred embodiment, the first year of the DMP, and the last of a PP, is typically the year in which the account is used to begin a periodic payment, such as providing income during semi or full retirement. The length of the DMP is also specified for each account and can be of any length; however, in the preferred embodiment, this length is the number of years it takes for half of the individuals alive with demographic characteristics actuarially similar to the owner (or owners of the account if it is a joint survivor) at the beginning of the DMP to have died. This statistic is routinely evaluated by numerous publicly available sources and the method and source for this statistic is not the subject of the present invention. In the case of the use of certain insurance arrangements, such as ones tied to longevity indices as described above, these arrangements may need to impose limitations (maximums or minimums) on or require the DMP to be of and to periodically readjust to be of a particular length.

By the designed operation of the present invention, the assets available at any time in the DMP will be exhausted by the end of the DMP given expected investment market conditions that prevail at any given time during the DMP and on which portfolios of assets created using the present invention at any of those given times are based. Accordingly, the scaling processor of the present invention takes into account the desired degree and cost of maintaining a matching insurance product that can continue into the Insured Completion Period before it calculates and identifies any potential surplus of assets.

The Insured Completion Period starts at the end of the DMP and defines the time characteristics of insurance arrangements that might be matched to the payout that is expected to be available at the end of the DMP. By definition, the ICP continues until the account owner (or owners of the account if it is a joint survivor) have died.

FIG. 1 shows a series of repeated cycles during which the present invention is designed to operate. They can be manually initiated or can be scheduled to run on a periodic basis through the Account Data Collection module. As each cycle is performed, a scaled hypothetical portfolio is generated that, using the logic and operation of the present invention covers a specified payout liability while applying certain methods identified in the present invention to manage risks. The scaled hypothetical portfolio of assets created by the present invention is thus referred to as a Covered Liabilities with Managed Risk or "CLMR." The usual process for completing an evaluation of the full set of current conditions comprised of measurement, determination, evaluation and scaling of a CLMR portfolio and the production of a report and instructions relating to the CLMR portfolio is identified in FIG. 1 as a "CLMR Determination Cycle," "CLMR Cycle" or "Cycle".

FIG. 1b shows how the present invention responds to a change in the Direct Management Period that might arise between one CLMR Cycle and another. This change is signaled to the processor by a change in the value of $Y_{DMP-E}$ or n (as further described below and in FIGS. 6a-6c). At that time, the number of payout periods for the current cycle will automatically lengthen and an allocation of assets indicated at the end of the Cycle will automatically adjust to the lengthened period. This is a valuable feature in that the length of time that assets need to last through the DMP can, and frequently does, change over time, and the present invention needs to be able to accommodate those changes as they arise in the course of its normal operation.

Turning now to FIG. 2, the overall information paths of the present invention needed to complete any given CLMR Determination Cycle are presented in block diagram form. Beginning with block 100, any pre-existing information is retrieved from storage and made available for editing and update by account owners or agents providing updates for the account owners. These settings will be used during the CLMR Cycle and one or more may be limited or restricted by the types of insurance products associated with the account should those have any contractual requirement linked to assets in the account, such as those described above. Through the use of a terminal and/or web access capabilities, these settings can be adjusted at any time and saved back to a stored location time stamped with the date on which they had been updated. Block 100 provides for the setting and input of highly advanced CLMR parameters through its various screens, but it also provides for a very basic use when requested by a user. This basic use relies on the fact that there are families of fully defined CLMR configurations that all demonstrate similarly beneficial characteristics but which differ in only a single setting. In such a basic use, only enough questions need be asked to pick the right family and then to set the single differentiating setting within that family. FIG. 6d illustrates such a simplified interface. In it, question 5 "Do you intend for this to be matched to a following deferred annuity?" is sufficient to define a CLMR family that has a three year step out to 90%; and question 2, "What % of your income are you planning to replace?" is sufficient within that family to define an appropriate target aggregate allocation to fixed income securities setting. All other settings being common to the family identified by question 5, these two questions are sufficient to define a full range of CLMR settings that are appropriate for this basic user. If the answer to question 5 is "No," then that indicates that a different CLMR family would be appropriate—one without the step out setting. The answer to question 2 similarly defines the appropriate target aggregate allocation to fixed income securities for that family. By this type of use, even basic users are able to utilize most, if not all, of the capabilities afforded by the present invention without needing to be an expert in the use and interactions of all of the individual advanced settings that are available. The time stamps on inputs are not important to the present invention other than to allow it to differentiate the latest entries in any given location that its processors will deem to be current. Data which has been superseded is retained in storage, though, unless otherwise specified, is retained only for archival purposes.

The Account Data Collection module also has a means of initiating a full CLMR Determination Cycle. Each initiation causes the remaining processing modules to go through only a single cycle. The present invention is able to initiate itself on a periodic cycle by the Account Data Collection module checking the current date (in the preferred embodiment at least once per day) and determining if that date matches or exceeds the rebalancing date stored in the Account Data Collection module. In that event, the Account data Collection module automatically initiates a CLMR Determination Cycle.

The Account Data Collection module also is able to record the date on which the account owner (or owners in the case of a joint survivor account) dies. When the owner (or owners in the case of a joint survivor account) is reported as having died, instead of initiating another CLMR Determination Cycle, the Account Data Collection module initiates the Early Withdrawal Processor (shown in Block 800 and described later).

The final primary role of the Account Data Collection module is to prepare and initialize all temporary storage locations needed to complete a CLMR Determination Cycle with respective data on the current information on applicable settings for the account, the latest information on market conditions, including current prices and relevant price fluctuation data since the last CLMR Determination Cycle was performed, and the latest information on applicable insurance rates.

Since collection of data about current market and insurance rate information can typically apply equally to CLMR Determination Cycles run on all accounts on any given day without getting stale, the process of re-collection and re-characterization of the market and insurance information need not be repeated for each Cycle on each Account; however, the preferred embodiment requires that this part of the data collection process be completed at the greater of one day or the last time a Cycle was performed on any account whose data is known to the Account Data Collection module.

After all current data on account settings and the market has been collected and respective variables initialized, current data on the assets in the account is then collected from either online brokerage records electronically queryable from the present invention or by manual entry through the Account Data Collection module. Though the Account Data Collection Module provides for such manual data entry, the preferred embodiment utilizes the Account Data Classification processor (Block 200) to electronically obtain that information and to classify the various securities held in the account by their primary asset type. Primary asset types for the preferred embodiment of the present invention are listed in FIG. 6b.

The Account Data Classification processor initializes the remaining storage locations needed for the Cycle to proceed.

Once all needed temporary storage locations have been initialized, control passes to the CLMR Composition Data Processor, block 300, which creates a hypothetical portfolio, with the specified overall % mix between fixed income and non-fixed income securities, has the specified degree of dollar duration matching (including through the advanced duration shaping parameters identified in FIG. 6c), the degree of fixed income securities in the most immediate periods of the DMP and other criteria specified in the Account Data Collection module. In the preferred embodiment, the CLMR Composition Data Processor subdivides the DMP into equal periods, typically of a year each, and then identifies a mix of future value assets, by primary asset class, that would liquidate in that period to provided the needed cash outflow. In order to satisfy, these sub-period requirements, while satisfying the overall requirements for the DMP, the CLMR Composition Data Processor uses a multi-constraint solver to find a solution to each sub-period, and by summation, to the whole.

This part of the process is completed on an undenominated and unscaled portfolio, a unitary portfolio, built up from a payout stream that starts with a payout of one or an order of magnitude factor thereof in the first sub-period of the DMP, defines the payouts in each of the subsequent sub-periods through the remainder of the DMP (which may include a provision for inflation related growth as set in the Account Data Collection module), and then completes a multi-criteria solution for a portfolio of sufficient size to satisfy the overall CLMR conditions as well as to satisfy the required payouts in each sub-period. While there are various approaches utilizing linear and nonlinear simultaneous equations as well as iterative convergence methods that are well recognized in the art, the present invention is not specific to the use of any particular method, only that the method used be sufficient to satisfy the criteria set and the primary asset classes allowed in the specific embodiment made.

The multi-criteria solver may also have additional capabilities, well known in the art, to optimize the mix of multiple classes of non-fixed assets. For the present invention, this capability is not necessary. The present invention only requires at least one class of non-fixed assets, but can accommodate multiple classes of non-fixed income assets.

The preferred embodiment of the current invention utilizes sub-periods of no longer than one year and identifies fix income assets of suitable tenure matched to each sub-period. For CLMRs with high non-fixed settings in the Account data Collection Module, some sub-periods may have no fixed income securities identified to mature in those periods.

The CLMR Composition Data Processor also performs a stochastic evaluation of the hypothetical portfolio, through Monte Carlo or other recognized means, to identify the mean or expected surplus and the probability distribution of potential surplus or deficit during each of the sub-periods and at the end of the DMP given historical yield and price trends of the security classes utilized for the hypothetical portfolio.

The final step of the CLMR Composition Data Process is to calculate and store for later use several characterizing statistics for the hypothetical portfolio, such as its effective rate of return for the DMP and a reduced level of payout that would have a specified greater level of probability, given historical rates of return and volatility, than the 50% or mean case. In the preferred embodiment, this higher level of probability is 75%.

After the operations of the CLMR Composition Data Processor are complete, control passes to the Scaling Processor, block 400, which determines which constraints, typically, but not limited to, currently available assets and the cost of increasing ICP, should govern the size of the scaled hypothetical portfolio as of the date of the current Cycle. The more detailed discussion that follows about sub-module 158 provides additional detail about other settings that the Scaling Processor is designed to consider in the preferred embodiment.

Since the Scaling Processor is able to detect varying types of potential surplus or deficit and since the Account Data Collection module will contain account preferences, including notification, about scaling responses to these differing conditions, if one of these conditions is detected, the Scaling Processor provides for a confirmation step if one of the conditions appears for which a notification variable has been set.

The Scaling Processor also considers the degree to which the newly scaled hypothetical portfolio compares to the current portfolio of assets. If the newly scaled amount is different from the prior scaled amount such that a threshold defined in the Account Data Collection module is not exceeded, the Scaling Processor will set the resulting scale to cause the hypothetical portfolio to match the size of the current assets. This provides a means for reducing the possibility that the Cycle will produce a large number of small adjusting trades that will incur trading costs but would not likely create any material change to the resulting CLMR portfolio.

The final step of the Scaling Processor is to write the scaled portfolio size by primary asset class, outcomes distribution, and other calculated temporary variables into an updated record with a new time stamp for each mix back out to the storage module of the Account Data Collection module.

After the Scaling Processor is complete, control flows to the Net Changes Order Processor, block 500, where needed increases and decreases in currently held assets in the account are identified, where amounts for the initial period in the remaining DMP, if the Cycle is being run during the DMP, are transferred to a money market or other designated cash account, and where amounts of any securities what are surplus to the required CLMR are identified, and if specified, transferred to a segregated account.

Trades include additions to, and potentially reductions from the insured amounts pertaining to the ICP for the account.

As a general observation, the present invention works equally well regardless of whether the assets that go into the Cycle are substantially like a CLMR already (as when a Cycle is being performed in repetition on a previously constructed CLMR portfolio and ICP insurance is accordingly already substantially in place) or when they arrive in a substantially different mix and duration with no ICP insurance in place. In the first instance, the net changes needed are likely to be small and in the latter quite large. The Net Changes Order Processor produces the same CLMR portfolio matched to current conditions and insurance whether the starting point is close or dramatically different.

If the CLMR cycle is being run without an electronic connection to a trading system, the identified trades are written out to the storage module of the Account Data Collection module without a confirmation. If it is, confirmation codes from the electronic trading system are written, along with the trade records to the storage module of the Account Data Collection Module.

An ordinary Cycle is complete once these calculated amounts have been written to the storage module. At that point, the Report Generation Module, block 600, extracts that stored data and formats it into user accessible web pages, distributable reports, and terminal screens. FIG. 6d shows an illustration of the most basic report on results can be presented, in that case, along with a listing the basic inputs needed to generate that result. Account owners can be notified that the Cycle is complete and they can utilize either a web based or a terminal based means to access the data and reports on the rescaled portfolio, related securities trades and related insurance changes that resulted from the completed Cycle.

As previously noted, most embodiments of the present invention require that the Cycles terminate at the time that the account owner (or owners in the case of a joint survivor account) has died. The Account Data Collection module is able to take action when this kind of event has occurred. This activates the processor which performs closeout calculations, or at a minimum suppresses trade execution of further Cycles absent explicit confirmation by an authorized third party, block 800.

The Early Withdrawal Processor (block 800) performs a particularly significant role when a form of ICP insurance that is enabled by the present invention is used. This is a form which reduces the amount of assets available at the beginning of any given cycle that need to be set aside for matched insurance coverage during the ICP. Traditional forms of such insurance involve a material number of assets up front in order to purchase the needed annuities to cover the contingent period during the ICP, even if the length of the DMP is sufficiently long to mean that the likelihood of needing the contingent annuity is less than 50%. The present invention strictly manages assets during the DMP such that those assets can be pledged, substantially or wholly in lieu of a traditional up-front payment (i.e. at the time each Cycle is performed), as payment for the insurance during the ICP if needed. This maximizes the number of assets available for the DMP, and thus the payout that can be supported during the DMP, while preserving the coverage during the ICP. Though the present invention fully performs with the use of traditional up-front payments for the ICP coverage in the preferred embodiment, a second preferred embodiment utilizes the capabilities of the present invention to enable this alternate form of insurance which can significantly increase the supportable payout levels during the lives of the account owner (or owners in the cast of a joint survivor), while still preserving higher matched insured levels into the ICP, if needed.

With the forgoing brief dissertation, an illustrated implementation is presented hereinbelow.

Each of the sub-modules and data flows below are numbered so that they clearly identify into which of the primary modules described in FIG. 2 they belong. For instance, all of the sub-modules described below from 310 to 380 are all parts of the logic flow needed to implement the CLMR Composition Data Processor identified as block 300, and discussed in the forgoing brief dissertation about that processor.

Figure 4:
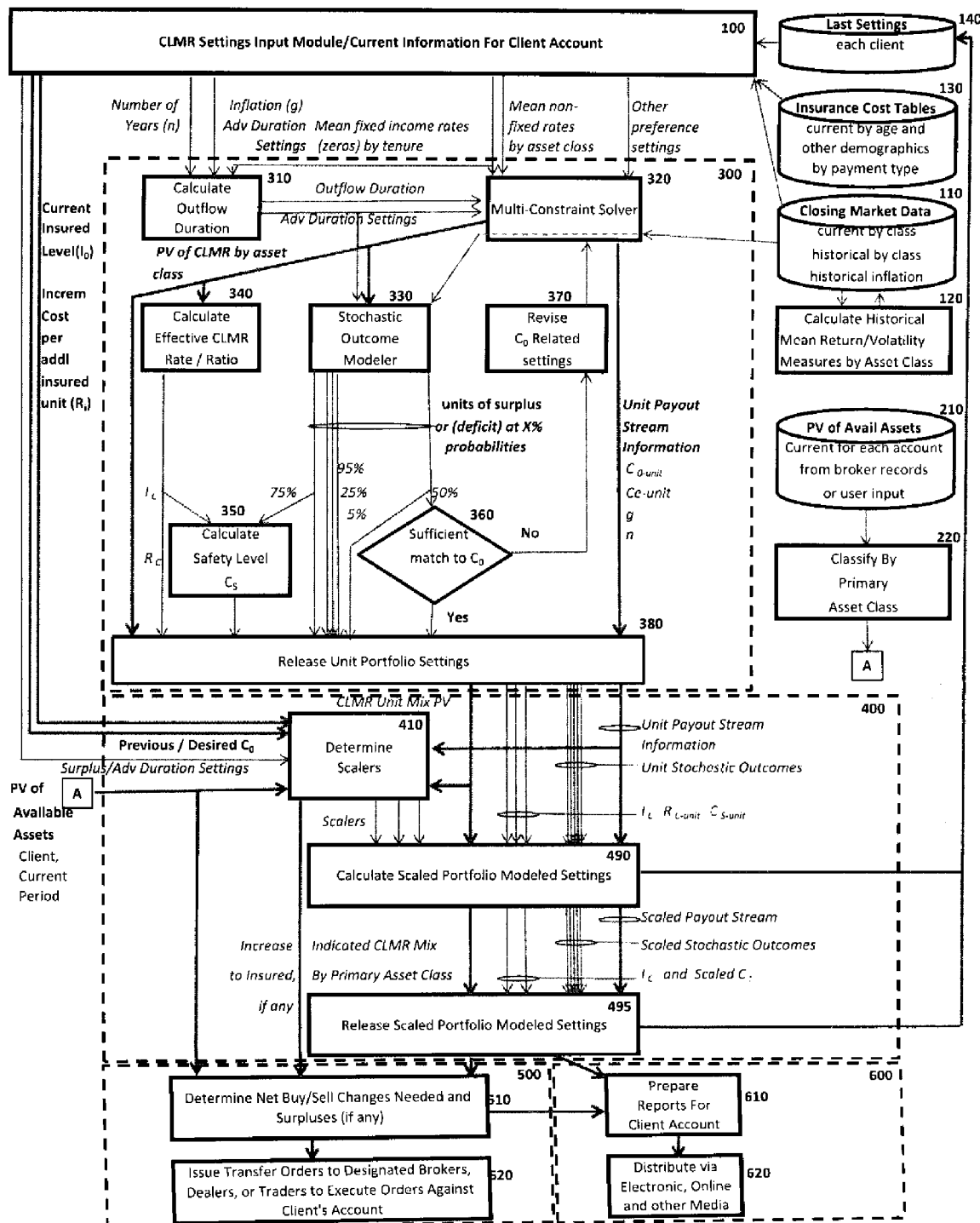
FIG. 4 is a logic flow depicting the processing path and data storage devices for the account data collection module information of the present invention.

The first operation involves collection of current data applicable to a given account and, if indicated by current account settings, initiation of a CLMR Cycle. This is accomplished via the logic structure depicted in FIG. 3. Logic conceptually begins at block 110 and proceeds to block 120, where incoming market data, closing market prices in the preferred embodiment, is collected on a wide range of securities from external pricing and quoting networks, with a representative set from each primary asset class and each fixed income tenor from one year to up to thirty years and beyond. Block 120 derives certain statistical characteristics for each asset class, minimally including and in addition to current price, a mean yield or return expectation and variance or volatility measure derived from over a sustained period of time comparable to the DMP for the account. These data may include inflation expectations as might be discerned from quoted forward pricing. The means for performing these calculations are readily understood in the art and should be matched to the techniques and models that will later be used in the stochastic modeling block (FIG. 4, block 330). There are no novel or unique requirements needed to implement this step in the present invention. This data may be stored in a coordinated array of data in matrix format.

In a similar fashion, current market data is collected from publicly quoted insurance sources in block 130. This current pricing information is classified by start date, relative to the current date, of insurance products, typically delayed start annuities, tabulated by actuarially significant demographic data (e.g. age, sex, zip code, etc.) pertinent to the quoted products. There are no novel or unique requirements for the kind of demographic characteristics that must be collected for proper classification as these are well known in the art and only need to be matched with a data element in the account data (block 154) to be described later so that a correct lookup can be accomplished. This data may be stored in a coordinated array of data in matrix format.

The final data storage element relates to specific data about the account, its owners, their preferences about CLMR settings and any prior information about the account, its assets, or its owners. Prior information includes data on any previously established linked insurance products whether established through previous CLMR Cycles of through unrelated purchases. Examples of the data elements for each account can be found in FIGS. 6a-6c. The data storage function in block 140 manages the storage of these data elements along with a time stamp of when they were last updated.

The activities of blocks 110/120, 130 and 140 can all run asynchronously from each other in any order, however, they should be executed contemporaneously with each other so that all contain information that is current. With the exception of block 140, the results stored for block 120 and 130, can be reused for CLMR Cycles on many accounts as long as they are run contemporaneously, generally on the same day.

CLMR Cycles on any given account begin their coordinated execution in block 150, which can occur either when account information is accessed by an authorized user through block 160 or if a periodic, often daily, check is made comparing the last time a CLMR Cycle was run for that account, adding the days indicated by the requested rebalancing frequency for that account (f/365) (the sum being a "rebalancing date") with the resulting date, when taken in comparison with the current date, indicating whether or not a requested rebalancing date has arrived or has passed. In the event of the latter, a CLMR Cycle will be initiated by block 150 automatically with the last updates from block 160 becoming current, by definition.

Block 152 executes the retrieval and restorage of all data elements for a particular account from the storage of block 140 and places the contents into temporary storage locations so that they are readily accessible to the CLMR processor modules.

Block 154 specifically manages the editing of the temporary user and account demographic data elements, illustrated more particularly in FIGS. 6a-6c. Data elements are presented for editing through Block 160. Significantly, block 154 identifies the form of linked insurance to be utilized for any additions, or reductions if allowed, that might be indicated by the present invention at the end of one of its Cycles. They are stored in between CLMR Cycles through Block 152.

Block 156 specifically manages the editing of the temporary CLMR preference settings data elements, illustrated more particularly in FIGS. 6a-6c. These settings are used to match the CLMR Portfolio to a particular outflow stream and to implement limitations, if any, on the characteristics of the CLMR Portfolio that may be imposed by the forms of linked insurance that have been indicated for use in block 154 or have already been put into use with the account. Settings that might most often be subject to insurance based limitations include: the ending date of the DMP ($Y_{DMP-e}$) or the related number of years in the DMP (n) in the case of linkage to one or more longevity indexed insurance arrangements, and the Percent of Non-Fixed ($NFR_{DMP}$), the Percent of Dollar Duration Match ($DD_{DMP}$), and Percent of $C_o$ in fixed income securities for the first year ($CR_{DMP-1}$) in the case of forfeiture based insurance arrangements. Block 154 is able to access any such limitations by reference to temporary storage locations of that data made by Block 170. Subject to such limitations, if any, the settings provided for by Block 156 include an inflation assumption setting (stored in temporary location—g), which should be set to a non-zero number if the outflow stream is to follow a growing shape. When the outflow is to remain constant through the DMP, g should be set to zero. Block 156 contains manually entered asset information if an electronic data feed is not enabled. Block 156 also identifies the asset classes that will be included in the CLMR portfolio. Finally, block 156 maintains temporary storage locations for settings from the previous CLMR Cycle, such as the last Insurance level ($I_0$). Data elements are presented for editing through Block 160. They are stored in between CLMR Cycles through Block 152.

Block 158 specifically manages the editing of the temporary surplus and deficit preferences data elements, illustrated more particularly in FIGS. 6a, 6b, and 6c. These settings pre-define responses in the Stochastic Outcome Modeler (Block 330 described in more detail later) for evaluations and the Scaling Processor (Block 410 described in more detail later) to for execution to different types of surplus or deficit. The notification data elements identify whether notification and user confirmation is required before certain specified surplus or deficit actions can be taken. One particularly significant user setting is the $Active_T$ (FIG. 6a) setting which enables Block 520 to execute trading orders at the end of the next Cycle. Until this setting has been set to "On" or "Y", all calculations and notifications will be performed but no trades will be submitted for execution. In the preferred embodiment, notification is set to provide change of status notice but not to hold up a status change. Data elements are presented for editing through Block 160. They are stored in between CLMR Cycles through Block 152.

Like blocks 110/120, 130, and 140, block 160 can be run asynchronously from the others, but does not need to have been run within the same twenty four hour period as a CLMR Cycle as is the case for blocks 110/120, 130, and 140. Block 160 utilizes a variety of readily available methods, including web services, and terminals, to present data elements such as the ones shown in FIGS. 6a, 6b and 6c in a readily editable and understandable form for humans. The only requirement of block 160 is that it be able to retrieve information from the stored data records.

Block 170 performs a lookup in the insurance cost table to identify the current rate for the account owner (or owners if the account is joint) that matches the type of insurance preferred for the ICP should the CLMR cycle trigger the need for an increase, or decrease, of insurance and current levels of insurance coverage by start year. The results are stored respectively in the temporary variable location $R_i$ and $I_0$ (by start year). Block 170 also looks up and stored for use by Block 156 and other processors in the present invention, any limitations that type or other currently in use types of insurance, and the current level of insurance coverage.

Block 180 accesses the applicable rates for the asset classes selected for inclusion in the CLMR portfolio. At a minimum, there is one non-fixed asset class.

Continuing with FIG. 4, control passes to the CLMR Composition Data Processor, starting with the calculation of the dollar duration of the DMP outflows which is performed in block 310. Outflows follow the formula $C_{0\text{-}unit}*(1+g)^n$ where $C_{0\text{-}unit}$ is a unitary amount of payout in the first year of the DMP and n is the number of times the payout will occur within the DMP. In the preferred embodiment, n is considered to be annual such that it is equal to the number of years in the DMP. To provide sufficient significant digits of precision, the preferred embodiment of the present invention is to set $C_0$ at 1,000,000.

The calculated outflow duration is saved into a temporary storage location where it and other advanced duration settings (from block 156) become available for the Multi-Constraint Solver (block 320). As has been previously described, the multi-constraint solver sets up a number time sub-periods within the DMP no fewer in number than the number of different outflow events scheduled for the DMP. The solver utilizes linear and non-linear simultaneous equations, iterative convergence techniques, or other readily available methods to satisfy the constraints of the CLMR portfolio both for individual payout periods (e.g. the fixed percentage of the targeted outflow in the first sub-period—$CR_{DMP-1}$) but also for the portfolio in general (e.g. the overall target fixed to non-fixed income ratio—$NFR_{DMP}$). If Carry Forward Previous Settings ($CF_{y-n}$) has been set to "Y", constraints to preserve the proportion of surplus balances from the previous CLMR Cycle, deficits in non-fixed leading to a temporary change away from the $NFR_{DMP}$, and any increases in the $NFR_{DMP}$ that arise from the step in of higher initial year allocations to fixed-income securities ($CR_{DMP-1}$ and $n_s$) coming forward a year, if set, will also be considered. The multi-constraint solver typically relies on the mean expected return, but not the variance or volatility of the asset classes from which it is choosing.

One set of primary constraints that is frequently added to moderate and shape payout volatility and overall duration is a requirement that the allocation to fixed income securities be a fixed percentage (usually 70%) of the targeted outflow in the first sub-period ($CR_{DMP-1}$) with the allocation to fixed stepping down in a linear or non-linear pattern over a set number of subsequent sub-periods ($n_s$). FIG. 6c identifies other advanced constraint settings ("Advanced Constraint Settings") that help to more specifically constrain duration. These include (1) a requirement that the allocation to fixed income securities step up in a linear or non-linear pattern over a set number of sub-periods ($n_{so}$) to a set amount ($CR_{DMP-last}$) in the final sub-period in the payout sequence and (2) the requirement that the allocation to fixed income securities start in a user specified year ($n_{tilt}$) and tilt in a linear or non-linear fashion from that year ($CR_{Tilt-Yr}$). The constraints relating to the allocation to fixed income securities for each payout period in the payout stream give precedence to the highest allocation constraint for that sub-period. Two further constraints apply to whether any increases in fixed income allocations relating to the step in constraint will be applied in a CLMR Cycle. One identifies a threshold amount of change—in the preferred embodiment it is the amount of valuation change in percentage terms from the prior year—in the non-fixed income portion of the CLMR composition on the occurrence of which the step in increase in fixed income allocations is suspended for that CLMR Cycle. This is used to affirmatively prevent the step in conversion of non-fixed to fixed income in a CLMR Cycle when non-fixed assets might have a higher than average chance of a higher than average recovery in the next CLMR Cycle. When this setting is used, the conversion typically catches up in the following year when the change threshold is no longer met. The second such setting turns this threshold checking constraint on and off, such at if it is set to off, the constraint is not applied, Another set of constraints control the release of any surpluses generated during the payout for any given year. These include (1) a degree of maximum surplus, expressed as a % of the payout stream, (MSPLS) that will be retained as a reserve against under performance of non-fixed income assets in future periods before any excess will be released as an additional paid out amount for that CLMR Cycle, (2) the amount of the current composition that is set aside for or a pre-payment of the maximum surplus (MSPLS$_{Pre}$), (3) a moderator setting which further holds back additional surplus if the maximum surplus has been exceeded in any given year (MODR), (4) a number of years over which the maximum surplus will reduce to the end of the DMC (POY$_{MS}$), (5) a number of years over which the moderation setting will reduce to a neutral value by the last period of the DMC (POY$_{MODR}$), and (6) a setting that suspends a complete refresh of CLMR settings each CLMR cycle in favor of a continuation of settings and any surplus retention balances from the prior CLMR cycle (CF$_{Y-N}$) which is most frequently, and may be used in isolation and combinations, to allow surplus amounts held by the above constrains from any previous CLMR Cycle and/or non-fixed income asset balances, even if they have led to a deviation from the target NFR$_{DMP}$, to carry into a current CLMR Cycle without a change. Another set of constraints may include the presence of annuities having pay outs that at least partially span into the DMP which, for the purpose of the Multi-Constraint Solver are treated as fixed income securities paying out in the respective DMP periods.

The result of the multi-constraint solver is a hypothetical portfolio of future values by asset class of sufficient size and composition to be able to generate the defined unitary outflow stream in each of the periods in the DMP. The mean yields or rates of return are used to bring the future values for each of the periods back to a present value. Summing these provides the present value, by primary asset class, of the hypothetical unitary CLMR portfolio. This detail is stored in a temporary location and may be a coordinated array of data in matrix format. The sum is stored in the PV$_{C-unit}$ location.

After the PV of the hypothetical unitary portfolio ("Unitary CLMR Portfolio") has been determined, it is subjected to a stochastic model of the performance of the securities in the CLMR portfolio, based on historical performance of each and their volatility in block 330. The stochastic model implements the surplus retention and release constraints described above under Advanced Constraint Settings as it evaluates potential for variation in the multi-year evolution of the CLMR portfolio through to the completion of the DMC. As previously noted, the methods for performing this stochastic analysis evaluation may often utilize, but not be limited to, Monte Carlo techniques and other stochastic evaluation procedures known in the art. These basic methods are not unique to the present invention other than that they must provide sufficient information to identify a probability distribution of surplus and deficit around a mean or an outcomes frequency distribution relative to useful standard frequency of occurrence thresholds (e.g. 5%, 25%, 50%, 75%, and 95%). Important outcomes measures include not only the range of payout levels for each year of the DMC but also key risk metrics such as the size and frequency of occurrence of year to year changes in the pay out level for that year when that represents an amount below the target for that year, the size and frequency of occurrence of overall year to year changes in the pay out level for that year regardless of whether or not they are above or below the payout target for that year, average payouts over the entire DMC and even some stochastic run quality measures such as convergence trends should a Monte Carlo technique have been chosen. This detail is stored in a series of temporary locations for later tabular and graphical presentation and may be a coordinated array of data in matrix format.

Executing in parallel (or asynchronously in either order with) block 330, block 340 performs two calculations and stores them in additional temporary storage locations. The first is the effective interest rate of the Unitary CLMR Portfolio which is calculated as the internal rate of return (IRR) of the outflow stream built in block 310 with the PV$_{C-unit}$ in the zero, or at the beginning of the initial, time period. The result is stored in temporary location L. The second calculation is the CLMR ratio which is simply PV$_{C-unit}$/C$_{0-unit}$. The result is stored in the temporary location, R$_c$.

Block 330 produces a range of probabilistic outcomes, which include not only the expected, or 50% probability, outcome but also a safer outcome (often at the 75% certainty level, but settable using the P$_{CS}$ temporary storage location) which is often at some degree of deficit utilizing the payout based on C$_{0-unit}$. Block 360 tests whether the mean outcome of the Unitary CLMR Portfolio is zero after the stochastic model; however, if it is not, the unitary outflow is adjusted down (if a deficit is indicated in the 50% probably level) and upwards (if a surplus is indicated at the 50% probability level), and the multi-constraint solver is repeated until convergence is achieved. If there is a sufficient match to validate that the CLMR portfolio fully liquidates by the end of the DMP, a flag is set for block 380 identifying that the results of the unitary portfolio generation are valid and complete.

While block 360 is testing the mean (50% probability of occurrence) outcome of the Stochastic Modeler (block 330), block 350 is determining a safety level of payout that matches an account settable higher level of certainty using the setting in the P$_{CS}$ temporary storage location. The reduction in C$_{0-unit}$ to provide for the safer level of outcome is defined by the formula F*i/((1+i)^n−1), where F is the indicated deficit at the P$_{CS}$ level of certainty, i is I$_c$ from block 340 and n is the number of periods remaining in the DMP. The result of this calculation is stored in location C$_s$.

The CLMR Composition Data Processor module is complete when the flag from block 360 is set to yes and block 380 can release the details and related statistics of the CLMR unitary hypothetical portfolio for subsequent processing.

The next step of the process is to determine the extent to which the Unitary CLMR Portfolio should be scaled up for the current CLMR Cycle. This is accomplished in Block 410, whose operation is detailed below under the discussion of FIG. 5. Scaling off of a unitary portfolio is a rapid way to size the portfolio up to one of a number of possible size constraints for the Cycle. A variety of possible sizing responses have been provided for through account data input in block 158. Though illustrative in themselves, these point to a number of the common size constraints that might be applied through the scaling module of the present invention. These may depend on whether the available assets have increased or decreased since the last Cycle, and, if for instance, the assets had increased, whether the resulting portfolio should increase only to the extent needed to support a preset increased payout amount or whether it should increase to the full extent of the increase in the assets. By calculating simple ratios, the present invention is capable of rapidly evaluating these kinds of applicable limits, selecting the one most applicable scale for the most applicable limit, and saving that result for use by later processors.

Although the current illustrative description separates the task of scaling the CLMR into development of a unitary portfolio and then scaling it, many of the scaling functions can be fully incorporated into the multi-constraint solver discussed previously as block 320 without altering the effectiveness of the present invention.

The Scaling Processor in block 410 calculates and then saves for later use three scalers: a scaler for the fixed income part of the portfolio (stored in location $R_{c\text{-}fixed}$), a scaler for the non-fixed part of the portfolio (stored in location $R_{c\text{-}nonfixed}$) and a scaler for the first year of the DMP ($R_{c\text{-}1styr}$). In most circumstances, these scalers are identical for all three, however, settings made in block 158 evaluated in block 410 can direct them to differ. For instance, if a setting has been made in block 158 to limit payouts to the safety level ($C_s$) but to keep all available assets in a portfolio of the CLMR composition, the scaler for $R_{c\text{-}fixed}$ and $R_{c\text{-}nonfixed}$ will both be determined relative to the size of all available assets and the scaler for $R_{c\text{-}1styr}$ will be determined by block 410 relative to the lower level of $C_s$. If the assets available indicate an ability to provide for an expected payout greater than that recorded in the prior CLMR Cycle, settings for a one time increase in the payout or an overall increase in the CLMR Composition (i.e. to increase target par outs for the remainder of the DMC) from block 158 will direct those increases.

The Scaling Processor in block 410 similarly scales the needed ICP insurance coverage level to match the new CLMR portfolio levels and stores the new level in $I_{0\text{-}new}$.

Control then passes to block 490 where the results of scale calculations performed on each of the respective parts of the CLMR unitary hypothetical portfolio and its metrics, using the scaler values stored by block 410, are then stored into locations for later processing use (collectively the "Scaled CLMR").

Control then passes to block 495 where those values are released to the Net Changes Order Processor (block 500) and the Reports to User Generator (block 600).

Block 500 is further detailed in FIG. 4 as blocks 510 and 520.

Block 510 examines the current value of each asset classes previously stored by block 220 ("Current Assets") and compares those to the value of the respective classes in the Scaled CLMR stored by block 495. The Scaling Processor (block 410) will have assured that the value of the Scaled CLMR does not exceed in aggregate the value of the available assets, although it may be less. Block 510 utilizes a series of simultaneous equations, or other recognized solver method, to fully match the respective amounts of the asset classes in the Scaled CLMR. For instance, if the Scaled CLMR calls for $54,000 of fixed income securities for a year 2 period, and there are $55,000 of fixed income securities that mature in that period, $54,000 of those will be set aside for the Scaled CLMR requirements and $1,000 will be set aside in a temporary surplus. Other asset classes may have a deficit which is filled from the temporary surpluses of other asset classes. The balanced nature of the totals assure that there is enough surplus of some asset classes to match off the deficits in another. The results of the indicated additions (purchases or buy) and reductions (sales) are written to a set of temporary storage locations that can be a coordinated array of data in matrix format.

If the present invention is connected to automated trading systems capable of executing the buy and sell actions indicated by block 510 processing and the Active$_T$ user settable flag has been set to "On" or "Y", block 520 retrieves any needed authentication and connection information from the block 140 data storage, translates the block 510 additions and reductions into the needed proprietary formats of the automated trading system and transmits those instructions using electronic means supported by those automated trading systems.

Finally, at the completion of a normal CLMR Cycle, block 610 prepares information on the evaluated CLMR, including its expected performance over the DMP years, ending size numbers, starting and ending composition and the indicated buy-sell instructions. FIG. 6*d* illustrates one of the most basic presentations along with the most basic settings needed to drive its creation. The display in the lower left of FIG. 6*d* illustrates how the probability differentiated outcomes from the indicated CLMR might develop in the presence of volatility in the non-fixed income portions of the CLMR composition similar to those that have manifested themselves over the last thirty years. It shows the likelihood of payout amounts of differing levels by year in the pay out stream. The heavy middle line is the 50% probability of occurrence. The dotted lines above and below show, in this case, the 80% up and down probabilities, respectively, and the solid lines above and below show, in this case the 95% up and down probabilities. It is this ability to show investors the potential relative influence of volatility that is important to helping them to understand the potential impact that volatility might have on their investment choice. The notes to the right of the graph on FIG. 6*d* shows, in text form, an additional important volatility impact—the likelihood that there will be a one year decline below a target payout level in any one year—and a comparison of that metric to another common investment allocation—in this case, a standard laddered portfolio. FIG. 6*d* also shows buttons by which a user can easily access (1) more detail in both tabular and graphical format on the specific present value and projected future value allocations of fixed income securities by tenure and type and non-fixed assets by type—both in aggregate and spread by payout year—and (2) more detail in both tabular and graphic format on more of the volatility exposure metrics (e.g. the year by year probability profiles that more specifically underlie the average propensity for a year to year downward movement reported in text form in the lower right portion of illustrative FIG. 6*d*). These reports can be stored for later retrieval.

Block 620 transmits the information formatted into the reports by 610 through web pages, terminals and other available electronic media, none of which, other than providing the needed supporting formats of each, are the subject of the present invention.

Figure 5:
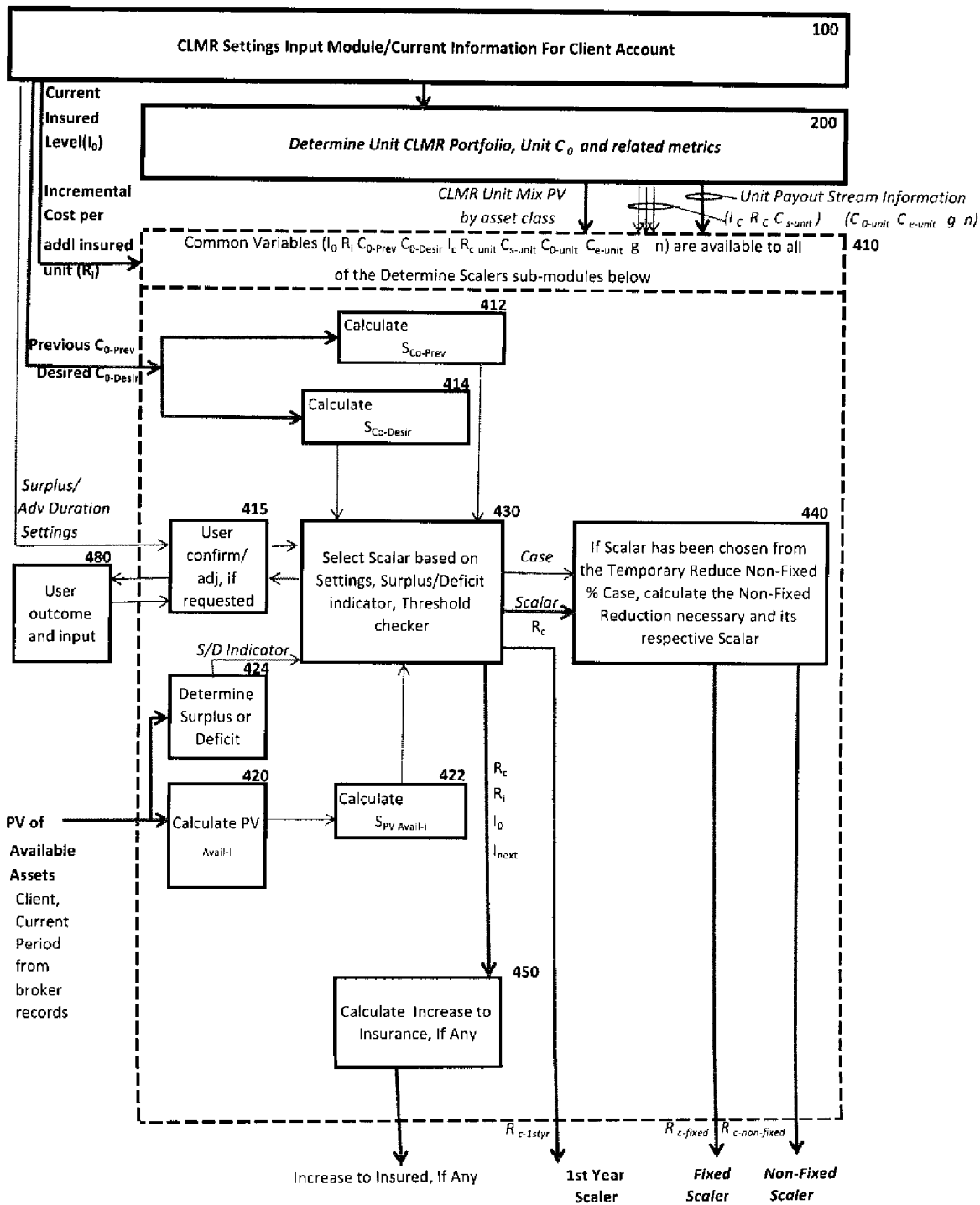
FIG. 5 is a logic flow depicting the processing path and data storage devices for the scaling module of the present invention.

Continuing now with FIG. 5, the more detailed logic for block 410 is conceptually begins with blocks 412 and 414 which calculate the scales needed to convert the Unitary CLMR Portfolio and its related first year payout amount ($C_0$) to either the $C_0$ of the previous Cycle advanced by one year ($C_{0\text{-}prev}*(1+g)$ or $C_{contd}$) or the desired $C_0$ ($C_{0\text{-}Desir}$) from block 156. The values for each will respectively been stored in locations $S_{Co\text{-}prev}$ and $S_{Co\text{-}desir}$.

Initially, block 415 retrieves the values stored by block 158 and stores them in temporary locations. Block 415 also determines when notification or confirmation is required for the account prior to any further actions being taken. Later, after block 430 determines whether any of the notification conditions have been met, block 415 also provides a means for transmitting the new data to the account owner or agent through block 480 and updating any of the block 158 data elements (and respective block 140 data elements) after any updates from block 480.

In parallel, or asynchronously with blocks 412 and 414 in any order, block 420 performs a calculation of the current assets available to fund a Scaled CLMR which is a function of the total Current Assets for the account less the amount of those Current Assets that would need to be set aside to purchase additional ICP insurance to match the ending year payout. The basic form of this relationship is $$PV_{Avail\ for\ CLMR} = PV_{Current\ Assets} - (I_{new} - I_{old})*R_i$$

where,
$PV_{Current\ Assets}$—is Current Assets
$I_{new}$—is the annual insured amount matched to the payout amount in the last period of the CLMR
$I_{old}$—is the annual insured amount from the previous Cycle ($I_o$), if any, and
$R_i$—is the incremental rate for another unit of insurance of the kind Selected for the account in block 154

This relationship can be reduced to $$(PV_{current\ Assets} + I_o * R_i)/(1 + (((i_c - g)/(1 - ((1+g)/(1+i_c))^n))*R_i*(1+g)^(n-1))$$

where,
$i_C$ is the effective rate calculated in block 340,
g is the inflation rate entered in block 156,
n is the number of years in the DMP, and
other variables reference storage locations as otherwise defined above,
all of which have been determined by prior processing modules before block 420 begins.

Block 422 calculates the scale needed to convert the Unitary CLMR Portfolio to the $PV_{Avail\ for\ CLMR}$ which is the simple ratio of the PV of the Unitary CLMR Portfolio to the $PV_{Avail\ for\ CLMR}$.

Block 430 compares the scales calculated in blocks 412 and 422 to determine if the current assets are sufficient to maintain the level of payout from the prior Cycle, if any, advanced by one year ($C_{contd}$). This is accomplished by determining if $S_{PV\ Avail-I}$ is greater than $S_{Co-Prev}$. A logical true or false is recorded into a storage location S_Indicator with true indicating that the initial test was true (i.e. that there is a surplus of $PV_{Avail\ for\ CLMR}$ relative to maintaining the payout levels of a prior Cycle advanced by one year). Block 430 then checks the selected settings from block 158 (see also FIG. 6a for example such selections) to determine which might apply. If S_Indicator is true and the account is set for a value of less than "All available assets" (i.e. one of the payout level restrictions applies) block 430 then performs the calculation to determine how many assets are needed (short of "all available") should be set aside for the more limited payout objective. This also applies when S_Indicator is false (i.e. the account is in deficit to its payout objectives) and the settings made in block 158 or updated by block 415 permit the annual payout amount to be reduced. The calculation of $PV_{needed}$ in all of these cases is $$C_{applieable}*(R_{c-unit} + R_i*(1+g)^(n-1)) - I_o*R_i$$

where,
$C_{applicable}$ is the limiting payout restriction and
the other variables are as noted for block 420.

If notifications are required, block 430 utilizes block 415 to provide those notifications and to obtain any updates before proceeding.

After determining the limiting factor, be it a payout limit vs assets or an asset level limit, the scale factor for that case to increase the Unitary CLMR Portfolio to the size of the CLMR indicated by the appropriate limiting factor is determined by calculating the ratio of the two and storing it in location $R_c$. If Carry Forward Previous Settings ($CF_{y-n}$) has been set to "Y", surplus balances from the previous CLMR Cycle will be preserved through the scaling calculation, deficits in non-fixed, will be set to be preserved, and any increases in the $NFR_{DMP}$ that arise from the step in coming forward a year, if set, will be brought into the current calculation.

Finally, if one of the block 158 settings indicates that the initial year payout level should be something other than $C_{0-unit}*R_c$, (typically something more conservative, such as $C_{s-unit}*R_c$), a lowered or increased scaler for the first year payout is stored in $R_{c-1styr}$. Otherwise, the value stored in location $R_c$ is also stored in location $R_{c-1styr}$.

Block 440 initially sets data storage locations $R_{c-non-fixed}$ and $R_{c-fixed}$ to be equal to $R_c$, and then it evaluates two special cases: one where the DMP start is in a future year (i.e. the CLMR Cycle is being performed during a Preparation Period) and the one where the account is shown by the S_Indicator value to be in deficit relative to the prior payout objective advanced by one year and the account setting from block 158 indicates that the difference should temporarily be made up with a reduction in the % on Non-Fixed in the Scaled CLMR.

In the first special case (i.e. during the preparation period), the composition of fixed income securities is preserved from the CLMR Composition, but it represents a smaller proportion of the $PV_{Avail}$ than if the CLMR Cycle were being performed during a DMP. Block 158 will have recorded and stored a % non-fixed in some reference year prior to the beginning of the DMP. In evaluating this special case, block 440 will first determine the % non-fixed for the current year by interpolating linearly or non-linearly between the % non-fixed for the current year between the reference year (PP Reference year or $T_{PR-R}$) and the % non-fixed for the DMP in the year that the DMP starts. Next, the non-fixed income scaler and the fixed income scalar are adjusted to shift the resulting mix of fixed and non-fixed to match the interpolated % non-fixed.

In the second special case, $R_c$ will have been set to $S_{Co-prev}$ and there will be no incremental insurance (as there had been no chance since the prior Cycle). The non-fixed income scaler ($R_{c-non-fixed}$) is then determined by first calculating a revised non-fixed ratio with the formula $$PV_{Avail}/(R_c*PV_{Unified\ CLMR\ portfolio}) - (1 - NFR_{DMP})$$

where,
$NFR_{DMP}$ is the data value stored by block 156, and
other variables reference storage locations as otherwise defined above,
and then determining the non-fixed income scaler ($R_{c-non-fixed}$) as the ratio of the new $NFR_{DMP}$ to the previously input $NFR_{DMP}$ and multiplying that by R. Any previous surplus balances (including prefunded ones from the initial period) available will be utilized before altering the current year payout or the non-fixed ratio going forward.

Block 440 concludes by storing the established $R_{c-non-fixed}$ and $R_{c-fixed}$ into storage locations for use by later processors.

Turning now to FIG. 6a, this serves to illustrate the kinds of data layouts that can be used by block 160, the relationships between labels suitable for blocks 154, 156, and 158 and typical default values (in brackets) where the present invention is often set to operate. The present invention can operate with one or more of these (e.g. inflation (g), set to zero, including the ICP insured levels which can be set to None in block 158. FIG. 6c shows additional advanced settings than can be used to fine tune duration setting constraints, FIG. 6b identifies a number of common Primary Asset Classes. The only ones that are essential for the operation of the present invention is to have zero coupon rates for fixed income securities covering the years of the DMP and at least only representative asset close for non-fixed income securities. The addition of additional primary asset classes, as long as they are supported with market data and the embodiment of the stochastic modeler, add specificity to the present invention but do not change its basic utility.

Figure 7:
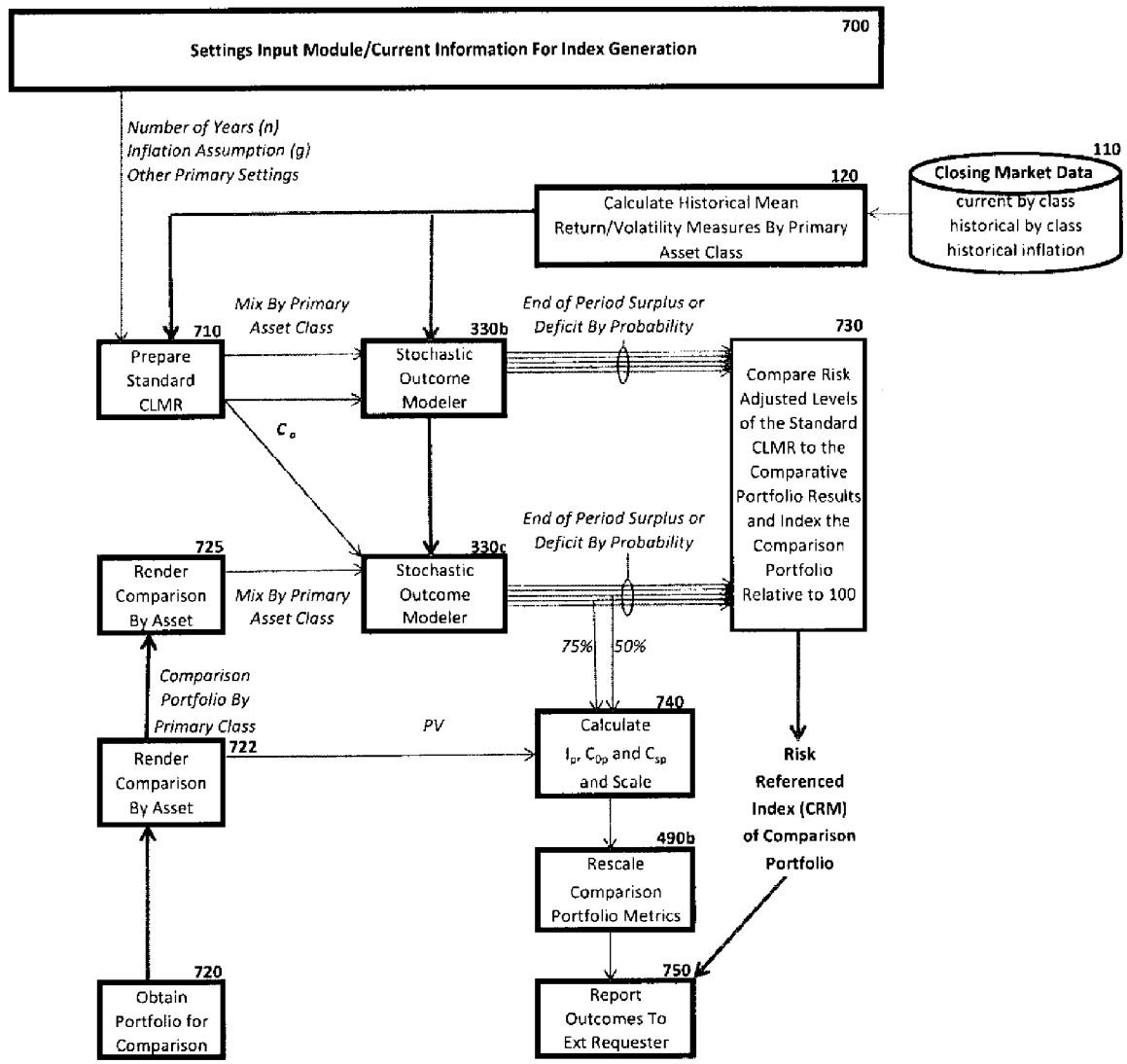
FIG. 7 is a logic flow depicting the processing path and data storage devices for the index generation module of account reporting module.

In a separate aspect of the present invention, the foregoing capabilities are also able to generate comparative indices of potential performance between different portfolios, which consider not only the expected return characteristics of those portfolios but also the potential that they will underperform. This is accomplished via the logic structure depicted in FIG. 7 (a "CLMR Index Cycle"). Logic conceptually begins in block 700 where a standard set of settings to be used in all index calculations is established utilizing the logic previously described in block 100. For setting, editing, and storing data values for a CLMR Cycle, except that the automatic initiation functions of 160 instead initiate a CLMR Index Cycle. Like the functions of a CLMR Cycle, which can iteratively be performed on many accounts, the logic of a CLMR Index Cycle can also iteratively be performed to generate an index for many comparative portfolios. The settings established in block 700 will not vary between comparative portfolios evaluated, although market information from blocks 110 and 120 will typically be updated daily as they are in support of CLMR Cycles. There is no difference in the operation of blocks 110 and 120 between the way they operate for CLMR Cycles and CLMR Index Cycles. CLMR Index Cycles do not utilize sub-blocks 130 and 170 of block 100.

In the preferred embodiment for CLMR Index Cycles, g is set to zero, the DMP start year is the current year, the DMP end year is fifteen years from the current year, the $NFR_{DMP}$ is 30% and the $P_{CS}$ is at 75%, although other settings can be utilized with equal effectiveness as long as they are equally applied to all portfolios evaluated using the same market conditions from blocks 110 and 120.

Once settings have been established, block 710 prepares and evaluates a Unitary CLMR Portfolio using the setting data values stored by block 700.

Control then passes to block 330b which performs the same stochastic outcome evaluation functions on the Unitary CLMR Portfolio produced by block 710 as block 330 does as part of a CLMR Cycle.

Individually, or iteratively covering multiple portfolios for comparison, data about the securities, the primary asset classes to which they belong, and the current value of each of those securities is loaded from external sources in block 720.

Block 722, summarizes the holdings in the comparison portfolio by primary asset class using the same minimum asset class requirements for the CLMR Cycle and block 725 converts those into a % breakdown by primary asset class and then scales that % breakdown up to be identically sized as the standard CLMR from block 710 but with the mix by primary asset class that matches the comparison portfolio obtained in block 720 (a "Unitary Comparison Portfolio").

Block 330c performs the same stochastic outcome evaluation functions on the Unitary Comparison Portfolio produced by block 725 as block 330b does in the Unitary CLMR Portfolio produced in block 710.

Block 730 calculates the net present value of the unitary outflow stream for the Unitary CLMR including the surplus or deficit, if any, at the 50% probability (the "mean" or "expected") outcome, using the $I_C$ for the standard CLMR as the discount rate, and block 730 records the surplus or deficit at a standard downside outcome level defined by $P_{CS}$. Block 730 performs the same calculations on the Unitary Comparison Portfolio and then subtracts the downside case surplus or deficit of the comparison portfolio from the downside case surplus or deficit of the standard CLMR reference portfolio to quantify the degree to which the comparison portfolio might provide a greater or lesser surplus than the reference portfolio in the downside case. This is stored as the relative downside ("Relative Downside") between the comparison portfolio and the CLMR reference portfolio. The Relative Downside is then added to (or subtracted from depending on its sign) the expected (50% probability or mean case) surplus of the comparison portfolio to generate a Risk-Adjusted Expected Return. The Risk-Adjusted Expected Return, is then divided by the initial asset value of the portfolio and multiplied by 100 to produce the Risk Referenced Index Value ("CLMR Rating") for that comparable portfolio. Block 730 stores the index value in a coordinated matrix referencing the date the index was generated, a reference number for the comparison portfolio, and the CLMR Rating calculated on that date.

Block 740 performs metric calculations on the comparison portfolio in the same manner as blocks 340 and 350 do in a CLMR Cycle.

Block 490b performs a rescaling of the results and metrics of the Unitary Comparison portfolio in the same manner as block 490 does in a CLMR Cycle.

Block 750 performs a reporting function relating to the evaluation of the comparison portfolio as blocks 610 and 620 do in a CLMR Cycle.

Figure 8:
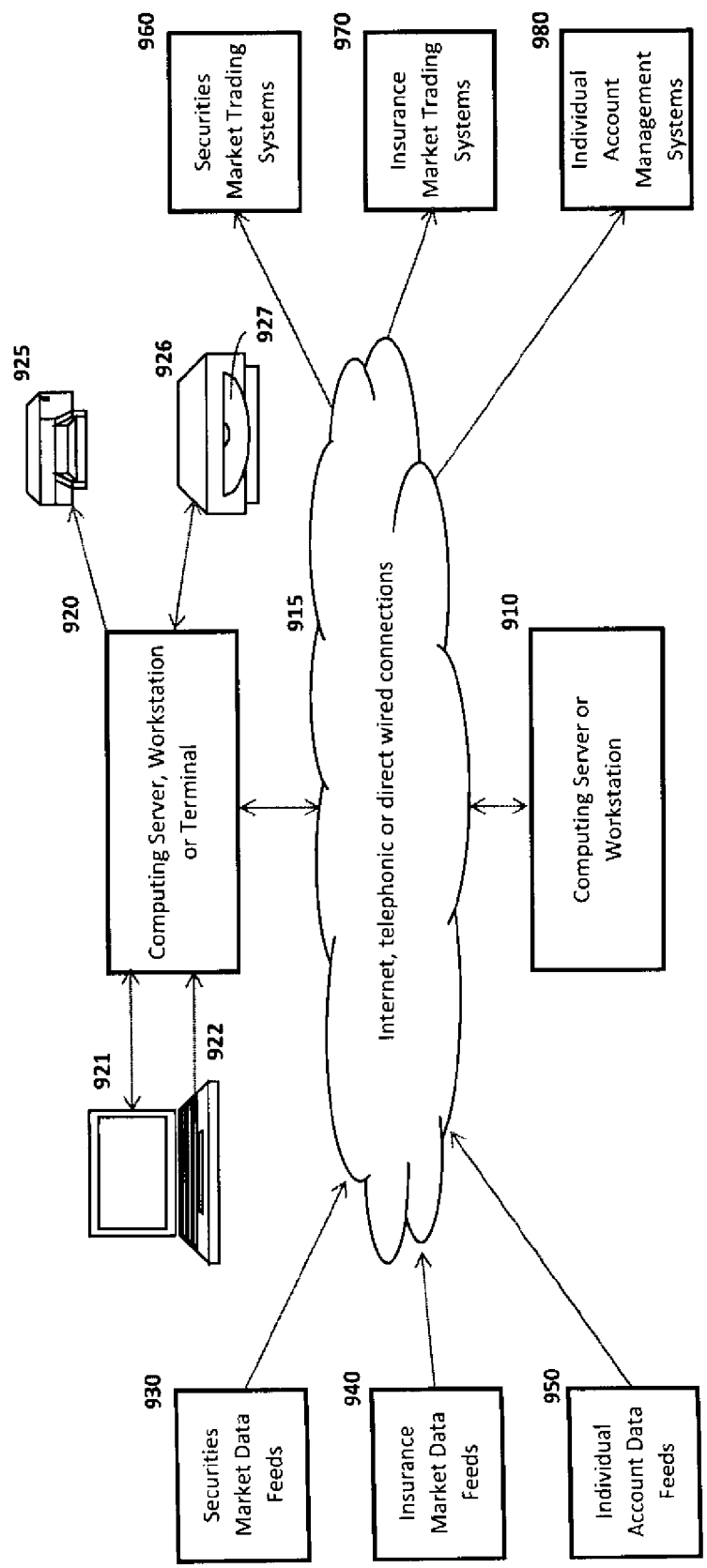
FIG. 8 is a block diagram of a computing system (including a computer program) according to the present invention.

Finally, the computer system of the present invention comprises both hardware and software elements. With reference to FIG. 8, the hardware and software required to perform the logic of the present invention reside on one or more computing servers or workstations (910). Though many of the logical steps in the present invention can benefit from being performed on a single server or workstation, there are numerous references to differing steps that can be performed in parallel or asynchronously in any order. Each block, and sub steps thereof, described in FIGS. 2-7 can reside on one or more computing servers or workstations interconnected either through the internet, telephonic, direct wired, or other electronic communications connections (915). Server(s) comprising 910 all contain a CPU or a part thereof, one or more high speed random access memory devices, and permanent and semi-permanent long term storage devices such as hard disks, removable solid state memory devices, and optical storage devices.

In addition, account holders, their agents and others with authorized access to data stored on 910, will have formatted access to that data provided to them either though a server or workstation that is either additional to or fully integrated with 910. This presentation server or workstation also contains or has access to similar computing devices as 910. In addition, it has connected to it real time display devices, such as monitors capable of providing the formatted information for easy understanding by users (921) and various devices for addressing and updating different data elements so presented by means of keyboards and voice recognition systems and pointed such as arrow keys, mouse and trackball and other pointing devices. The workstation is also equipped with various means for retaining the formatted information for later access through printers (925) and various forms of long term storage devices (926) such as hard disks, removable solid state memory devices, and optical storage devices and their respective fixed, removable and insertable storage media (927). Such devices can also be used to receive media on which software used to implement the present invention is stored.

Although the 910 and the 920 devices and related support equipment are able to operate together standing alone from external data sources by obtaining needed current data on the securities and insurance markets as well as to assets and insurance associated with for each account through manual data input, the present invention is greatly enhanced through electronic connection to such information through third party providers of such electronic reporting services (930, 940 and 950, respectively).

Likewise, although the 910 and 920 devices and related support equipment are able to operate together standing alone from external trade execution and account tracking resources by providing reports accessible through 920 to allow owners, agents and others with authorized access to the account to manually contact external trade execution and account tracking resources, the present invention is greatly enhanced through electronic connection to such third party systems for trade execution and account tracking (960, 970 and 980, respectively).

The above described arrangement is merely illustrative of the principles of the present invention. Numerous modifications and adaptations thereof will be readily apparent to those skilled in the art without departing from the spirit and scope of the present invention. For example, specific formulae and time periods are illustrative rather than limiting. Therefore, the present invention should be construed as limited only by the appended claims.

What is claimed is:

1. A method for managing payout and risk in an account, using a computing system having a processor and a storage, the method comprising:
   (a) retrieving, from the storage into the processor, information concerning the account, the information comprising a desired payout from the account over a given period of time, the information being retrieved comprising:
      a number of time periods subsequent to an allocation in a first user-specified one of the time periods to fixed income securities that amounts applicable to fixed income will step down from an amount in the first user-specified one of the time periods and a percentage of the allocation in the first user-specified one of the time periods that will step down for each of those time periods;
      a number of said time periods and final percentage of step out; and
      a requirement that the allocation to fixed income securities start in a second user-specified one of the time periods and tilt in a linear or non-linear fashion from said second user-specified one of the time periods;
   (b) receiving, into the processor, information concerning assets of the account, the information concerning the assets of the account comprising a historical and projected future performance of the assets, the assets comprising fixed-income assets and non-fixed-income assets;
   (c) automatically determining, in the processor, an allocation of the assets of the account in accordance with the information received in steps (a) and (b) so as to match to a set degree a monetary weighted duration of the assets to a monetary duration of the desired payouts;
   (d) automatically providing for the sale and purchase of assets in the account to match the allocation of assets determined in step (c); and
   (e) performing steps (c) and (d) for each of said plurality of time periods to change a proportion of the fixed-income assets in the account to the non-fixed-income assets in the account to match to the set degree the monetary weighted duration of the assets to the monetary duration of the desired payouts.

2. The method of claim 1, wherein steps (a)-(d) are performed iteratively.

3. The method of claim 2, wherein iterations of steps (a)-(d) are automatically initiated periodically.

4. The method of claim 2, wherein iterations of steps (a)-(d) are initiated manually.

5. The method of claim 1, further comprising automatically providing for a disposition of the assets of the account in a situation in which an owner of the account dies before the given period of time has elapsed.

6. The method of claim 1, wherein step (a) comprises receiving a manual edit of the information retrieved in step (a).

7. The method of claim 1, wherein the information in step (a) comprises one or more life expectancies.

8. The method of claim 1, wherein the information in step (a) comprises a denomination for the account.

9. The method of claim 1, wherein the information in step (a) comprises external account information and authorization codes to enable the automatic retrieval and exchange of information with external data providers for the account.

10. The method of claim 1, wherein the information in step (a) comprises information about the insurance format and preferred carriers to be used if additional insurance coverage is indicated.

11. The method of claim 1, wherein the information in step (a) comprises information about previously procured insurance coverage and type for the account.

12. The method of claim 1, wherein the information in step (a) comprises information about carriers of previously provided insurance coverage included in the assets and authorization codes to enable automated retrieval of information about those policies.

13. The method of claim 1, wherein the information in step (a) comprises an inflation assumption.

14. The method of claim 1, wherein the information in step (a) comprises a target percentage of aggregate fixed income to non-fixed income securities in the allocation of assets.

15. The method of claim 1, wherein the information in step (a) comprises a starting percentage of aggregate fixed income and non-fixed income securities for the allocation of assets during a preparation period and a reference year for the starting percentage.

16. The method of claim 1, wherein the information in step (a) comprises a percentage of the desired payout to be established through the fixed income assets applicable to the first time period in the given period of time.

17. The method of claim 1, wherein the information in step (a) comprises an indication of an amount of any surplus which will be retained against future potential declines.

18. The method of claim 1, wherein the information in step (a) comprises an indication of an amount to be set aside from an initial allocation of assets to be available to cover future potential declines.

19. The method of claim 1, wherein the information in step (a) comprises an indication of an additional amount of any surplus which will be retained against future potential declines.

20. The method of claim 1, wherein the information in step (a) comprises an indication of a number of years over which a maximum amount of the surplus to be retained against future potential declines will itself decline.

21. The method of claim 1, wherein the information in step (a) comprises an indication of a number of years over which an extra amount of the surplus to be retained against future potential declines will itself decline.

22. The method of claim 1, wherein the information in step (a) comprises a percentage of the desired payout to be established through fixed income securities applicable to a last portion of the given period of time.

23. The method of claim 1, wherein the information in step (a) comprises a number of periods prior to an allocation in a last year to fixed income securities that amounts applicable to fixed income will step up to an amount in the last year and a percentage of the allocation in the last year that will step up for each of those periods.

24. The method of claim 1, wherein the information in step (a) comprises a percentage of the desired payout to be established through fixed income securities that will increase or decrease depending on how many sub-periods separate a given sub-period from a base year in the payout.

25. The method of claim 1, wherein the information in step (a) comprises an identification of a flag to perform or not to perform and a threshold for change in value of non-fixed income assets from a prior period beyond which, when such thresholds are exceeded and the flag is set, conversions to any extra step in allocations to fixed income assets will not be performed.

26. The method of claim 1, wherein the information in step (a) comprises an identification of a flag to carry certain settings from a prior Covered Liabilities with Managed Risk (CLMR) Cycle into the current CLMR Cycle.

27. The method of claim 1, wherein the information in step (a) comprises an indication of whether the allocation of assets can contain fixed income securities with tenures of greater than an end of the given period of time.

28. The method of claim 1, wherein the information in step (a) comprises an indication of how much a fixed income portion associated with any given year, particularly after a mid-point of the given period of time, can exceed a largest payout in the given period of time.

29. The method of claim 1, wherein the information in step (a) comprises a probability level that will be used to determine a more conservative level of outcome in probability related analyses.

30. The method of claim 1, wherein the information in step (a) comprises an indication of which asset classes will be allowed in the allocation of assets for fixed income securities.

31. The method of claim 1, wherein the information in step (a) comprises an indication of which asset classes will be allowed in the allocation of assets for non-fixed income securities.

32. The method of claim 1, wherein the information in step (a) comprises an indication of whether optimization will be allowed within an allowed set of classes of non-fixed assets in the allocation of assets.

33. The method of claim 1, wherein the information in step (a) comprises a definition of how many periods will be included in a calendar year.

34. The method of claim 1, wherein the information in step (a) comprises a threshold within which a change to an allocation of assets will not be indicated if the change is lower than the threshold.

35. The method of claim 1, wherein the information in step (a) comprises information about desired levels to which to resize a portfolio based on the allocation of assets and based on a degree to which there is a surplus or deficit necessary to achieve those levels relative to currently available assets.

36. The method of claim 1, further comprising receiving a user input through a user interface, the user input indicating a desire to use only basic inputs and where standardized Covered Liabilities with Managed Risk (CLMR) compositions, each expressing preset necessary combinations of CLMR definition settings for that standard composition, are automatically determined using the only answers to the basic inputs.

37. The method of claim 1, wherein the information in step (b) comprises historical and potentially future performance of the assets other than the current assets in the account.

38. The method of claim 1, wherein step (b) comprises accessing market data feeds relating to the assets.

39. The method of claim 1, wherein step (c) comprises creating a hypothetical portfolio comprising the assets, said creating the hypothetical portfolio comprising:
　i) creating an expected payout over a plurality of future time periods, and
　ii) creating the hypothetical portfolio to provide the expected payout over the plurality of future time periods through a multi-constraint solver.

40. The method of claim 39, wherein the hypothetical portfolio is evaluated to provide a probability distribution of a potential surplus or deficit.

41. The method of claim 39, wherein the hypothetical portfolio is initially unsealed, and wherein step (c) comprises determining a size for the hypothetical portfolio that is capable of satisfying step (c)(ii), and scaling the hypothetical portfolio to the size.

42. The method of claim 1, wherein step (c) comprises determining differences between an existing portfolio and the allocation of the assets.

43. The method of claim 42, wherein the differences are automatically traded to conform the existing portfolio to the allocation of the assets.

44. The method of claim 1, wherein step (c) comprises determining differences between previous insurance levels and new insurance levels to provide for a set degree of matched insurance to continue the expected payout in a situation in which an owner of the account lives beyond the life expectancy.

45. The method of claim 44, wherein the assets include insurance contracts, and wherein the differences are automatically transacted to modify the insurance contracts through purchase, sale or exchange to conform to the new insurance levels.

46. The method of claim 1, further comprising automatically generating a report for an account owner.

47. The method of claim 46, wherein differences between an existing portfolio and the allocation of assets are identified in order to facilitate manually performing trades to conform the existing portfolio to the allocation of assets.

48. The method of claim 46, wherein differences between previous insurance levels and new insurance levels are identified in order to facilitate manually performing transactions through purchase, sale or exchange to conform insurance to the new insurance levels.

49. The method of claim 1, wherein a requirement of one or more insurance accounts sets limits in the processor on the allocation of assets in order to meet the requirement.

50. The method of claim 49, wherein the requirement relates to a longevity index which is subject to change.

51. The method of claim 49, wherein the requirement relates to an agreement to forfeit the assets under predetermined conditions.

52. A system for managing payout and risk in an account, the system comprising:
   a computer-readable storage medium;
   a communication connection; and
   a processor, in communication with the computer-readable storage medium and the communication connection, the processor being configured for:
   (a) retrieving, from the storage, information concerning the account, the information comprising an expected payout from the account over a given period of time, the information being retrieved comprising:
      a number of time periods subsequent to an allocation in a first user-specified one of the time periods to fixed income securities that amounts applicable to fixed income will step down from an amount in the first user-specified one of the time periods and a percentage of the allocation in the first user-specified one of the time periods that will step down for each of those time periods;
      a number of said time periods and final percentage of step out; and
      a requirement that the allocation to fixed income securities start in a second user-specified one of the time periods and tilt in a linear or non-linear fashion from said second user-specified one of the time periods;
   (b) receiving, from the communication connection, information concerning assets of the account, the information concerning the assets of the account comprising a historical and projected future performance of the assets;
   (c) automatically determining an allocation of the assets of the account in accordance with the information received in steps (a) and (b) so as to match to a set degree a monetary duration of the assets to a monetary duration of the expected payouts;
   (d) automatically providing for the sale and purchase of assets in the account to match the allocation of assets determined in step (c); and
   (e) performing steps (c) and (d) for each of said plurality of time periods to change a proportion of the fixed-income assets in the account to the non-fixed-income assets in the account to match to the set degree the monetary weighted duration of the assets to the monetary duration of the desired payouts.

53. The system of claim 52, wherein the processor is configured to perform steps (a)-(d) iteratively.

54. The system of claim 53, wherein the processor is configured to initiate iterations of steps (a)-(d) automatically and periodically.

55. The system of claim 53, wherein the processor is configured to initiate iterations of steps (a)-(d) upon receipt of a manual command.

56. The system of claim 52, wherein the processor is further configured for automatically providing for a disposition of the assets of the account in a situation in which an owner of the account dies before the given period of time has elapsed.

57. The system of claim 52, wherein the processor is configured to perform step (a) by receiving a manual edit of the information retrieved in step (a).

58. The system of claim 52, wherein the processor is configured such that the information in step (a) comprises one or more life expectancies.

59. The system of claim 52, wherein the processor is configured such that the information in step (a) comprises a denomination for the account.

60. The system of claim 52, wherein the processor is configured such that the information in step (a) comprises external account information and authorization codes to enable the automatic retrieval and exchange of information with external data providers for the account.

61. The system of claim 52, wherein the processor is configured such that the information in step (a) comprises information about the insurance format and preferred carriers to be used if additional insurance coverage is indicated.

62. The system of claim 52, wherein the processor is configured such that the information in step (a) comprises information about previously procured insurance coverage and type for the account.

63. The system of claim 52, wherein the processor is configured such that the information in step (a) comprises information about carriers of previously provided insurance coverage and authorization codes to enable automated retrieval of information about those policies.

64. The system of claim 52, wherein the processor is configured such that the information in step (a) comprises an inflation assumption.

65. The system of claim 52, wherein the processor is configured such that the information in step (a) comprises a target percentage of aggregate fixed income to non-fixed income securities in the allocation of assets.

66. The system of claim 52, wherein the processor is configured such that the information in step (a) comprises a starting percentage of aggregate fixed income and non-fixed income securities for the allocation of assets during a preparation period and a reference year for the starting percentage.

67. The system of claim 52, wherein the processor is configured such that the information in step (a) comprises a percentage of the payout to be established through the fixed income assets applicable to the first time period in the given period of time.

68. The system of claim 52, wherein the processor is configured such that the information in step (a) comprises in indication of an amount of any surplus which will be retained against future potential declines.

69. The system of claim 52, wherein the processor is configured such that the information in step (a) comprises in indication of an amount to be set aside from an initial allocation of assets to be available to cover future potential declines.

70. The system of claim 52, wherein the processor is configured such that the information in step (a) comprises in indication of an additional the amount of any surplus which will be retained against future potential declines.

71. The system of claim 52, wherein the processor is configured such that the information in step (a) comprises in indication of a number of years over which a maximum amount of the surplus to be retained against future potential declines will itself decline.

72. The system of claim 52, wherein the processor is configured such that the information in step (a) comprises in indication of a number of years over which an extra amount of the surplus to be retained against future potential declines will itself decline.

73. The system of claim 52, wherein the processor is configured such that the information in step (a) comprises a percentage of the payout to be established through fixed income securities applicable to a last portion of the given period of time.

74. The system of claim 52, wherein the processor is configured such that the information in step (a) comprises a number of periods prior to an allocation in a last year to fixed income securities that amounts applicable to fixed income will step up to an amount in the last year and a percentage of the allocation in the last year that will step up for each of those periods.

75. The system of claim 52, wherein the processor is configured such that the information in step (a) comprises a percentage of the desired payout to be established through fixed income securities that will increase or decrease depending on how many sub-periods separate a given sub-period from a base year.

76. The system of claim 52, wherein the processor is configured such that the information in step (a) comprises an identification of a flag to perform or not to perform and a threshold for change in value of non-fixed income assets from a prior period beyond which, when such thresholds are exceeded and the flag is set, conversions to any extra step in allocations to fixed income will not be performed.

77. The system of claim 52, wherein the processor is configured such that the information in step (a) comprises an identification of a flag to carry certain settings from a prior Covered Liabilities with Managed Risk (CLMR) Cycle into the current CLMR Cycle.

78. The system of claim 52, wherein the processor is configured such that the information in step (a) comprises an indication of whether the allocation of assets can contain fixed income securities with tenures of greater than an end of the given period of time.

79. The system of claim 52, wherein the information in step (a) comprises an indication of how much a fixed income portion associated with any given year, particularly after a mid-point of the given period of time, can exceed a largest payout in the given period of time.

80. The system of claim 52, wherein the processor is configured such that the information in step (a) comprises a probability level that will be used to determine a more conservative level of outcome in probability related analyses.

81. The system of claim 52, wherein the processor is configured such that the information in step (a) comprises an indication of which asset classes will be allowed in the allocation of assets for fixed income securities.

82. The system of claim 52, wherein the processor is configured such that the information in step (a) comprises an indication of which asset classes will be allowed in the allocation of assets for non-fixed income securities.

83. The system of claim 52, wherein the processor is configured such that the information in step (a) comprises an indication of whether optimization will be allowed within an allowed set of classes of non-fixed assets in the allocation of assets.

84. The system of claim 52, wherein the processor is configured such that the information in step (a) comprises a definition of how many periods will be included in a calendar year.

85. The system of claim 52, wherein the processor is configured such that the information in step (a) comprises a threshold within which a change to an allocation of assets will not be indicated if the change is lower than the threshold.

86. The system of claim 52, wherein the processor is configured such that the information in step (a) comprises information about desired levels to which to resize a portfolio based on the allocation of assets and based on a degree to which there is a surplus or deficit necessary to achieve those levels relative to currently available assets.

87. The system of claim 52, wherein the processor is further configured to provide a user interface and to receive, through the user interface, a user input indicating a desire to use only basic inputs and where standardized Covered Liabilities with Managed Risk (CLMR) compositions, each expressing preset necessary combinations of CLMR definition settings for that standard composition, are automatically determined using only answers to the basic inputs.

88. The system of claim 52, wherein the processor is configured such that the information in step (b) comprises historical and potentially future performance of the assets other than the current assets in the account.

89. The system of claim 52, wherein the processor is configured to perform step (b) by accessing market data feeds relating to the assets over the communication link.

90. The system of claim 52, wherein the processor is configured to perform step (c) by creating a hypothetical portfolio comprising the assets, said creating the hypothetical portfolio comprising:
  i) creating an expected payout over a plurality of future time periods, and
  ii) creating the hypothetical portfolio to provide the expected payout over the plurality of future time periods through a multi-constraint solver.

91. The system of claim 90, wherein the processor is configured to evaluate the hypothetical portfolio to provide a probability distribution of a potential surplus or deficit.

92. The system of claim 90, wherein the processor is configured to create the hypothetical portfolio such that the hypothetical portfolio is initially unsealed, and wherein the processor is configured to perform step (c) by determining a size for the hypothetical portfolio that is capable of satisfying step (ii) of said creating the hypothetical portfolio, and scaling the hypothetical portfolio to the size.

93. The system of claim 52, wherein the processor is configured to perform step (c) by determining differences between an existing portfolio and the allocation of the assets.

94. The system of claim 52, wherein the processor is configured to perform step (c) by determining differences between previous insurance levels and new insurance levels to provide for a set degree of matched insurance to continue the expected payout in a situation in which an owner of the account lives beyond the life expectancy.

95. The system of claim 94, wherein the assets include insurance contracts, and wherein the processor is configured to transact the differences automatically to modify the insurance contracts through purchase, sale or exchange to conform to the new insurance levels.

96. The system of claim 93, wherein the processor is configured to trade the differences automatically to conform the existing portfolio to the allocation of the assets.

97. The system of claim 52, wherein the processor is further configured for automatically generating a report for an account owner.

98. The system of claim 97, wherein the processor is configured to identify differences between an existing portfolio and the allocation of assets in order to facilitate manually performing trades to conform the existing portfolio to the allocation of assets.

99. The system of claim 97, wherein differences between previous insurance levels and new insurance levels are identified in order to facilitate manually performing transactions through purchase, sale or exchange to conform insurance to the new insurance levels.

100. The system of claim 52, wherein the processor is configured to accept limits on the allocation of assets imposed by a requirement of one or more insurance accounts in order to meet the requirement.

101. The system of claim 100, wherein the processor is configured such that the requirement relates to a longevity index which is subject to change.

102. The system of claim 100, wherein the processor is configured such that the requirement relates to an agreement to forfeit the assets under predetermined conditions.

103. An article of manufacture for managing payout and risk in an account, using a computing system having a processor and a storage, the article of manufacture comprising:
 a non-transitory computer-readable storage medium; and
 code stored on the computer-readable storage medium, the code, when executed on the computing system, controlling the computing system for:
  (a) retrieving, from the storage into the processor, information concerning the account, the information comprising an expected payout from the account over a given period of time, the information being retrieved comprising:
   a number of time periods subsequent to an allocation in a first user-specified one of the time periods to fixed income securities that amounts applicable to fixed income will step down from an amount in the first user-specified one of the time periods and a percentage of the allocation in the first user-specified one of the time periods that will step down for each of those time periods;
   a number of said time periods and final percentage of step out; and
   a requirement that the allocation to fixed income securities start in a second user-specified one of the time periods and tilt in a linear or non-linear fashion from said second user-specified one of the time periods;
  (b) receiving, into the processor, information concerning assets of the account, the information concerning the assets of the account comprising a historical and projected future performance of the assets, the assets comprising fixed-income assets and non-fixed-income assets;
  (c) automatically determining, in the processor, an allocation of the assets of the account in accordance with the information received in steps (a) and (b) so as to match to a set degree a monetary duration of the assets to a monetary duration of the expected payouts;
  (d) automatically providing for the sale and purchase of assets in the account to match the allocation of assets determined in step (c); and
  (e) performing steps (c) and (d) for each of said plurality of time periods to change a proportion of the fixed-income assets in the account to the non-fixed-income assets in the account to match to the set degree the monetary weighted duration of the assets to the monetary duration of the desired payouts.

* * * * *